US012540726B2

(12) United States Patent
Rotholz et al.

(10) Patent No.: US 12,540,726 B2
(45) Date of Patent: Feb. 3, 2026

(54) MOUNTING ASSEMBLY FOR LIGHTING APPARATUS AND METHODS OF INSTALLATION THEREOF

(71) Applicant: Gantri, Inc., San Leandro, CA (US)

(72) Inventors: Zachary Rotholz, San Francisco, CA (US); Allan Jenn Ospina Nieto, Dublin, CA (US); Christopher Patrick Cien, Oakland, CA (US)

(73) Assignee: Gantri, Inc., San Leandro, CA (US)

( * ) Notice: Subject to any disclaimer, the term of this patent is extended or adjusted under 35 U.S.C. 154(b) by 0 days.

(21) Appl. No.: 18/954,814

(22) Filed: Nov. 21, 2024

(65) Prior Publication Data

US 2025/0189105 A1 Jun. 12, 2025

Related U.S. Application Data

(60) Provisional application No. 63/607,340, filed on Dec. 7, 2023.

(51) Int. Cl.

| | |
|---|---|
| ***F21V 23/00*** | (2015.01) |
| ***F21S 8/00*** | (2006.01) |
| ***F21S 8/02*** | (2006.01) |
| ***F21S 8/06*** | (2006.01) |
| ***F21V 21/03*** | (2006.01) |
| ***F21V 21/104*** | (2006.01) |
| ***F21V 25/12*** | (2006.01) |

(52) U.S. Cl.
CPC ............ *F21V 23/001* (2013.01); *F21S 8/026* (2013.01); *F21S 8/036* (2013.01); *F21S 8/061* (2013.01); *F21S 8/063* (2013.01); *F21V 21/104* (2013.01); *F21V 23/002* (2013.01); *F21V 25/12* (2013.01); *F21V 21/03* (2013.01)

(58) Field of Classification Search
CPC .... F21V 21/008; F21V 21/104; F21V 23/001; F21V 23/002; F21V 25/12; F21S 8/026; F21S 8/036; F21S 8/061; F21S 8/063
USPC .......................................................... 362/404
See application file for complete search history.

(56) References Cited

U.S. PATENT DOCUMENTS

| | | | | |
|---|---|---|---|---|
| 6,653,558 B1 * | 11/2003 | Bucher | .................. | F21V 21/03 174/67 |
| 2004/0042222 A1 | 3/2004 | Childs | | |
| 2004/0091362 A1 * | 5/2004 | Tseng | .................... | F04D 29/601 416/244 R |
| 2022/0254545 A1 * | 8/2022 | Hudson | .................. | H01B 7/385 |

FOREIGN PATENT DOCUMENTS

| | | |
|---|---|---|
| DE | 1464167 | 4/1969 |
| DE | 202010013132 | 2/2011 |

* cited by examiner

*Primary Examiner* — Laura K Tso
(74) *Attorney, Agent, or Firm* — Levine Bagade Han LLP

(57) ABSTRACT

Disclosed are mounting bracket assemblies, mounting brackets, mountable light fixtures, and methods of installation thereof. One aspect of the disclosure concerns an assembly for mounting a pendant light comprising a mounting bracket, a hanger, and a strain relief. Another aspect of the disclosure concerns an assembly for mounting a ceiling flush mount light or sconce comprising a mounting bracket, a mountable enclosure, and a threaded fastener. Also disclosed are methods for mounting a pendant light, a ceiling flush mount light, and a sconce.

16 Claims, 13 Drawing Sheets

MOUNTING ASSEMBLY FOR LIGHTING APPARATUS AND METHODS OF INSTALLATION THEREOF

CROSS-REFERENCE TO RELATED APPLICATION

This application claims the benefit of U.S. Provisional Patent Application No. 63/607,340 filed on Dec. 7, 2023, the content of which is incorporated herein by reference in its entirety.

TECHNICAL FIELD

The present disclosure relates generally to the field of mounting assemblies for surface-mounted light fixtures, and, more specifically, to improved mounting assemblies, mounting brackets, mountable light fixtures, and methods of installing such mounting assemblies, mounting brackets, and mountable light fixtures.

BACKGROUND

Surface-mounted light fixtures, such as ceiling-mounted light fixtures or wall-mounted light fixtures, are often the centerpiece of an interior space such as a living, bedroom, or hallway. Such light fixtures are often designed to be mounted to a surface (e.g., a ceiling or wall) of the interior space with mounting components that are custom-made for such light fixtures. In addition, once such a light fixture is mounted to a surface (e.g., the ceiling or wall), it is often difficult and time consuming to remove and replace such a fixture since a new light fixture requires new mounting components that may need new holes to be drilled into the ceiling or wall and old holes to be filled in and covered up. This can lessen the appeal of surface-mounted light fixtures for those that would like the ability to change such light fixtures over time to keep up with changing design aesthetics.

Moreover, surface-mounted light fixtures are often designed with professional installers or contractors in mind with respect to the installation or mounting procedure. For example, most traditional surface-mounted light fixtures are difficult for one person to install on their own. This is especially true during the wiring step since the installer often needs both hands free to carefully connect wires from the light fixture to wires from a ceiling or wall junction box while also keeping at least part of the light fixture near the junction box.

Furthermore, traditional surface-mounted light fixtures often do not allow room for error if one or more mounting components are misaligned or not level. This can increase the difficulty of mounting such light fixtures since an installer must often install and uninstall the mounting components multiple times before the light fixture is mounted correctly.

Therefore, improved mounting assemblies, mounting brackets, and mountable light fixtures are needed which address the above shortcomings and disadvantages. Such improved solutions should not be overly complicated to install and should allow an installer to easily compensate for small errors. Moreover, such improved solutions should make it possible for one person to safely install a surface-mounted light fixture. In addition, such improved solutions should be made of components that are cost-effective and easy to manufacture. Furthermore, such improved mounting assemblies and brackets should work with multiple types of surface-mounted light fixtures and allow a proprietor of an interior space to easily change light fixtures if desired.

SUMMARY

Disclosed are mounting bracket assemblies, mounting brackets, mountable light fixtures, and methods of installation thereof.

In some embodiments, an assembly for mounting a pendant light can comprise: a mounting bracket comprising a bracket lower plate, at least two bracket arms extending from the bracket lower plate to allow the mounting bracket to be mounted to a ceiling junction box on a ceiling, a U-shaped slot defined along part of the bracket lower plate, and two inclined tabs extending from the bracket lower plate; a hanger comprising a hanger top portion and a hanger bottom portion, wherein the hanger can comprise a hanger channel extending longitudinally through the hanger, wherein at least a segment of the hanger channel can comprise a threaded inner channel, wherein the hanger top portion can comprise a hanger head, a hanger skirt, and a hanger groove defined in between the hanger head and the hanger skirt, wherein the hanger groove only partially extends around a circumference of the hanger top portion; and a strain relief comprising an exterior threaded portion, a plurality of gripping flaps, and a strain relief channel extending longitudinally through the strain relief, wherein the strain relief channel can be configured to receive a pendant light cord of the pendant light, wherein the plurality of gripping flaps can be configured to clamp onto the pendant light cord when the exterior threaded portion is screwed into the threaded inner channel of the hanger, wherein the hanger can be detachably secured to and hangs from the mounting bracket when the hanger top portion is slid into the U-shaped slot, and wherein the two inclined tabs prevent the hanger from inadvertently sliding out of the U-shaped slot when the hanger hangs from the mounting bracket.

In some embodiments, the assembly can comprise a pendant light canopy and a securement knob, wherein the pendant light canopy can comprise a hanger contact surface, canopy lateral walls extending from the hanger contact surface, a canopy cavity defined by the hanger contact surface and the canopy lateral walls, and a canopy opening defined in a center of the hanger contact surface, wherein the securement knob can comprise a threaded lumen, wherein the hanger can comprise an exterior hanger threaded portion, and wherein a portion of the securement knob extends into the canopy cavity and the hanger contact surface is pushed against an underside of the hanger skirt when the threaded lumen is screwed onto the exterior hanger threaded portion to secure the pendant light canopy to the hanger.

In some embodiments, the assembly can further comprise a decorative pendant canopy, wherein the decorative pendant canopy can comprise a fire-proof enclosure disposed at a top of the decorative pendant canopy, wherein the fire-proof enclosure can comprise an enclosure opening, wherein the decorative pendant canopy can further comprise a canopy threaded lumen exposed by the enclosure opening, wherein the hanger can comprise an exterior hanger threaded portion, and wherein the canopy threaded lumen can be screwed onto the exterior hanger threaded portion to secure the decorative pendant canopy to the hanger.

In some embodiments, the pendant light canopy can be made in part of at least one of a metallic material and a fire-proof polymeric material.

In some embodiments, the hanger can be made in part of at least one of a metallic material and a fire-proof polymeric material, and wherein the strain relief can be made of a polymeric material.

In some embodiments, the bracket lower plate can further comprise a plate tail at a rear of the bracket lower plate, wherein the plate tail and at least one of the inclined tabs are configured to support an excess segment of the pendant light cord extending out of the hanger top portion that is wrapped around the mounting bracket.

In some embodiments, the hanger channel can be tapered such that a diameter of the hanger channel at the hanger bottom portion is greater than a diameter of the hanger channel at the hanger top portion, wherein the tapered shape of the hanger channel forces the plurality of gripping flaps to clamp onto the pendant light cord when the exterior threaded portion is screwed into the threaded inner channel of the hanger.

In some embodiments, the hanger groove has a groove height, and wherein the groove height can be greater than a thickness of the bracket lower plate to allow the hanger to slide into the U-shaped slot more easily.

In some embodiments, each of the bracket arms can comprise a distal arm segment and a proximal arm segment connected to the distal arm segment, wherein the proximal arm segment can be connected to the bracket lower plate, wherein the distal arm segment can be oriented substantially parallel to the bracket lower plate and can be positioned vertically above the bracket lower plate to create a clearance space to allow the hanger to slide into the U-shaped slot and hang from the bracket lower plate.

In some embodiments, each of the bracket arms can be shaped as a staircase step such that the proximal arm segment is oriented substantially perpendicular to the bracket lower plate and the distal arm segment.

In some embodiments, each of the two inclined tabs can be angled upward relative to the bracket lower plate at an angle between 15 degrees and 35 degrees.

In some embodiments, the assembly can further comprise a pendant light rod comprising a rod lumen extending longitudinally through the pendant light rod and a rod internal threaded portion defined along a distal segment of the rod lumen, wherein at least a segment of the pendant light cord can be configured to extend through the rod lumen, wherein the strain relief can comprise a bottom threaded portion, wherein the bottom threaded portion can be configured to be screwed into the rod internal threaded portion to allow the pendant light rod to be detachably coupled to the strain relief fastened to the hanger.

In some embodiments, the hanger skirt can be shaped as a flattened frustoconic comprising a conically sloped portion, and wherein at least part of the hanger groove extends down to the conically sloped portion.

In some embodiments, the hanger groove extends between 250 degrees and 300 degrees around the circumference of the hanger top portion.

In some embodiments, the U-shaped slot can comprise a widened open end and a semicircular closed end opposite the widened open end, wherein the widened open end has an open end width and the semicircular closed end has a closed end diameter, wherein the open end width can be greater than the closed end diameter, wherein a ratio of the closed end diameter and the open end width can be between 1:1.25 and 1:1.50, and wherein each of the two inclined tabs has a laterally inward side, and wherein at least part of each of the laterally inward sides defines the widened open end.

In some embodiments, an assembly for mounting a ceiling flush mount light or sconce can comprise: a mounting bracket comprising a bracket plate body, an elongated flat hook disposed at a first longitudinal end of the bracket plate body, an angled guidance tab disposed at a second longitudinal end of the bracket plate body opposite the first longitudinal end, and a plate opening defined along the bracket plate body in between the first longitudinal end and the second longitudinal end, wherein the mounting bracket can be configured to be mounted to at least one of a wall junction box and a ceiling junction box; a mountable enclosure comprising a mating tab extending from a first enclosure end of the mountable enclosure and a threaded port defined along a second enclosure end of the mountable enclosure opposite the first enclosure end, wherein the mating tab can be configured to be hooked onto the elongated flat hook of the mounting bracket to allow the mountable enclosure to hang from the mounting bracket and to rotationally pivot toward the mounting bracket, wherein the mountable enclosure can be configured to be coupled to a part of the ceiling flush mount light or sconce; and a threaded fastener configured to be screwed into and through the threaded port and into contact with the angled guidance tab to secure the mountable enclosure to the mounting bracket when the mating tab is hooked onto the elongated flat hook and the mountable enclosure encloses the plate opening of the mounting bracket.

In some embodiments, the angled guidance tab can be angled with respect to the bracket plate body by an angle of between 40 degrees and 50 degrees, wherein the angled guidance tab can comprise an enclosure-facing side and a rear-facing side, and wherein the threaded fastener can be configured to be screwed into and through the threaded port and into contact with the rear-facing side of the angled guidance tab.

In some embodiments, the mountable enclosure can further comprise an enclosure bracket body, a first enclosure lateral wall extending perpendicularly from the enclosure bracket body, a second enclosure lateral wall extending perpendicularly from the enclosure bracket body and opposite the first enclosure lateral wall, a first enclosure longitudinal end wall extending perpendicularly from the enclosure bracket body, and a second enclosure longitudinal end wall extending perpendicularly from the enclosure bracket body and opposite the first enclosure longitudinal end wall.

In some embodiments, the mating tab can extend from the first enclosure longitudinal end wall and can be angled with respect to the enclosure bracket body by an angle of between 2 degrees and 5 degrees, and the mountable enclosure has a clearance space separating an underside of the mating tab and the enclosure bracket body.

In some embodiments, the mating tab has a mating tab width, and wherein the first enclosure longitudinal end has an end width, wherein the mating width can be less than the end width.

In some embodiments, the elongated flat hook can comprise a hook proximal segment, a hook distal segment, and a hook middle segment connecting the hook proximal segment and the hook distal segment, wherein the hook proximal segment has a proximal segment length and the hook distal segment has a distal segment length, and wherein the proximal segment length can be greater than the distal segment length such that a hook clearance space is created between the hook distal segment and a mounting surface when the mounting bracket is mounted to the mounting surface.

In some embodiments, the hook middle segment can be substantially parallel to the bracket plate body, wherein the hook proximal segment and the hook distal segment are substantially perpendicular to the bracket plate body, and wherein the hook distal segment and the hook proximal segment are substantially parallel to each other.

In some embodiments, the mountable enclosure pivots or rotates with respect to the mounting bracket when the mating tab is hooked onto the elongated flat hook and the mountable enclosure freely hangs from the mounting bracket to allow a user to connect electrical wires from a light socket of the ceiling flush mount light or the sconce to electrical wires extending from the wall junction box or the ceiling junction box.

In some embodiments, the mountable enclosure and the mounting bracket are made in part of at least one of a metallic material and a fire-proof polymeric material.

In some embodiments, the assembly can further comprise a light socket enclosure, wherein the mountable enclosure can be configured to be coupled to the light socket enclosure, wherein the light socket enclosure comprises a mating interface for mating to at least one of a base cover, a light diffuser, and a light shade, and wherein the light socket enclosure can be a 3D-printed enclosure. In other embodiments, the light socket enclosure can be made using a traditional manufacturing technique such as injection molding.

In some embodiments, the mating interface can be a threaded interface protruding from the light socket enclosure and wherein the threaded interface can be configured to allow a threaded collar to be screwed onto the light socket enclosure via the threaded interface to detachably affix the base cover to the light socket enclosure.

In some embodiments, the mating interface can comprise angled grooves defined along external lateral sides of the light socket enclosure, wherein the angled grooves are configured to receive protuberances extending laterally inward from internal lateral sides of the light diffuser or light shade to allow the light diffuser or light shade to slide onto the light socket enclosure.

In some embodiments, the mountable enclosure can be substantially shaped as a flattened rectangular trough having five sides.

In some embodiments, a method of mounting a pendant light can comprise: fastening a mounting bracket to a ceiling junction box, wherein the mounting bracket can comprise a bracket lower plate, a U-shaped slot defined along part of the bracket lower plate, and two inclined tabs extending from the bracket lower plate; sliding a hanger down the two inclined tabs into the U-shaped slot to hang the hanger from the mounting bracket; and screwing a strain relief having a pendant light cord extending therethrough into a threaded inner channel of the hanger to clamp the strain relief to a segment of the pendant light cord, wherein the pendant light cord is connected to the pendant light.

In some embodiments, a method of mounting a ceiling flush mount light or sconce can comprise: fastening a mounting bracket to at least one of a wall junction box and a ceiling junction box, wherein the mounting bracket can comprise a bracket plate body, an elongated flat hook disposed at a first longitudinal end of the bracket plate body, and an angled guidance tab disposed at a second longitudinal end of the bracket plate body opposite the first longitudinal end; hooking a mountable enclosure coupled to a part of the ceiling flush mount light or the sconce onto the elongated flat hook of the mounting bracket, wherein the mountable enclosure can comprise a mating tab extending from a first enclosure end of the mountable enclosure and a threaded port defined along a second enclosure end of the mountable enclosure opposite the first enclosure end, wherein the mating tab can be configured to be hooked onto the elongated flat hook of the mounting bracket; and rotationally pivoting the mountable enclosure toward the mounting bracket and screwing a threaded fastener into and through the threaded port and into contact with the angled guidance tab to secure the mountable enclosure to the mounting bracket when the mating tab is hooked onto the elongated flat hook.

DETAILED DESCRIPTION

Figure 1A:
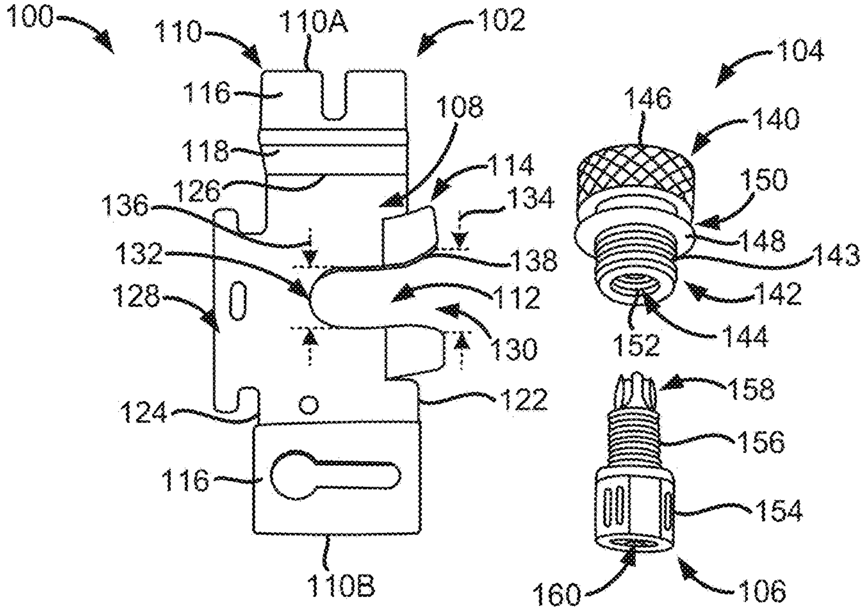
FIG. 1A illustrates one embodiment of a pendant light mounting assembly in a disassembled configuration.

FIG. 1A illustrates one embodiment of a pendant light mounting assembly 100 in a disassembled configuration. The pendant light mounting assembly 100 can be used to mount a pendant light 400 (see FIG. 4A) or another type of hanging light.

The pendant light mounting assembly 100 can comprise a mounting bracket 102, a hanger 104, and a strain relief 106. As will be discussed in more detail in the following sections, the strain relief 106 can be detachably coupled to the hanger 104 and a sub-assembly comprising the hanger 104 and the strain relief 106 can be detachably or removably secured to the mounting bracket 102 and be hung from the mounting bracket 102.

Figure 3A:
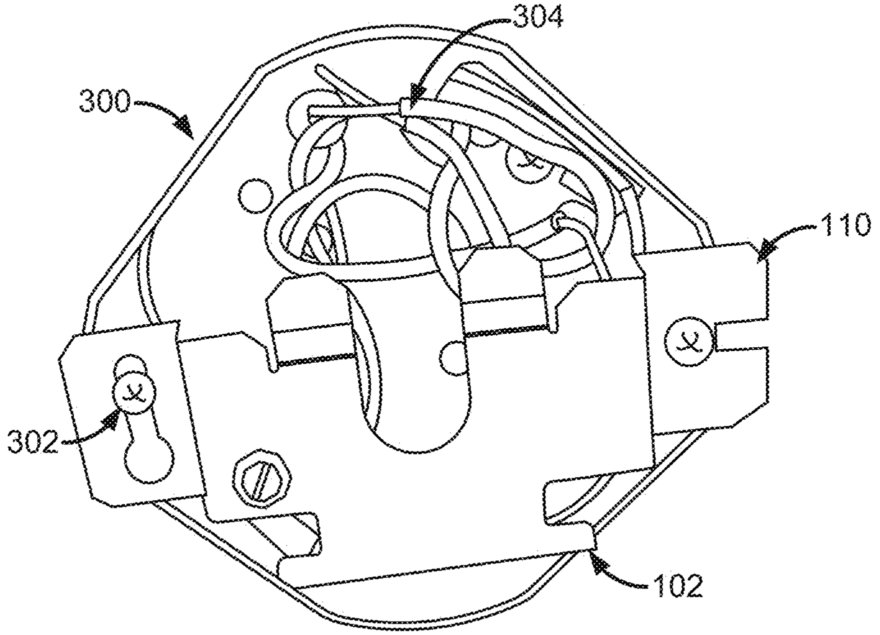
FIG. 3A illustrates a mounting bracket of the pendant light mounting assembly coupled to a ceiling junction box.
Figure 3B:
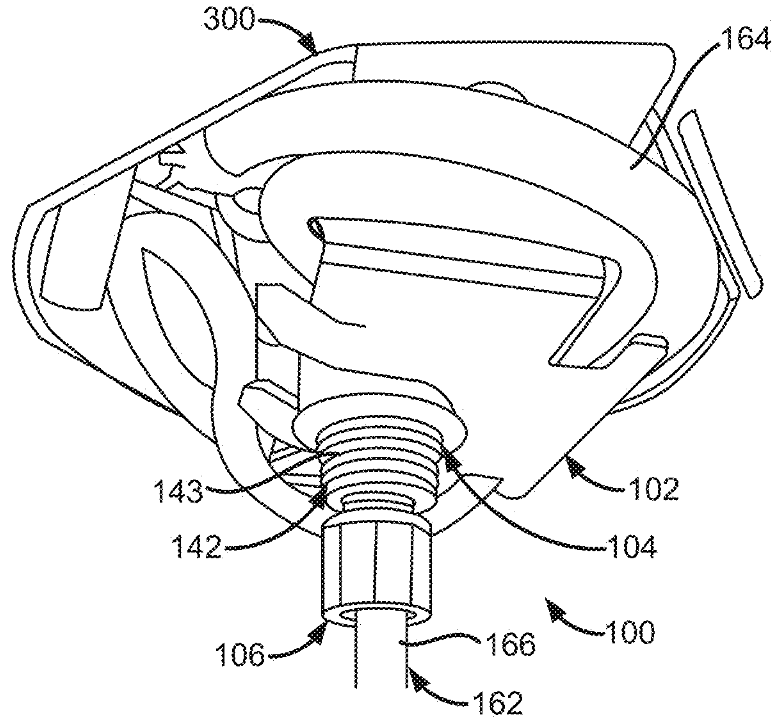
FIG. 3B illustrates the pendant light mounting assembly in an assembled configuration with an excess segment of a pendant light cord wrapped around the mounting bracket coupled to the ceiling junction box.

The mounting bracket 102 can comprise a bracket lower plate 108 and at least two bracket arms 110 extending from the bracket lower plate 108 to allow the mounting bracket 102 to be mounted to a ceiling junction box 300 (see FIG. 3A or FIG. 3B). The at least two bracket arms 110 can comprise a first bracket arm 110A and a second bracket arm 110B.

The mounting bracket 102 can also comprise a substantially U-shaped slot 112 defined along part of the bracket lower plate 108 and two inclined tabs 114 extending from the bracket lower plate 108.

Each of the bracket arms 110 can comprise a distal arm segment 116 and a proximal arm segment 118 connecting the distal arm segment 116 to the bracket lower plate 108. In some embodiments, the mounting bracket 102 can be affixed, secured, or otherwise coupled to the ceiling junction box 300 and/or part of the ceiling via the distal arm segment 116. For example, as shown in FIGS. 1A and 1B, each of the distal arm segments 116 can comprise cutouts or apertures in the shape of keyholes or slots to allow fasteners (e.g., screws) to affix, secure, or otherwise couple the mounting bracket 102 to part of the ceiling junction box 300 and/or the ceiling.

Figure 1B:
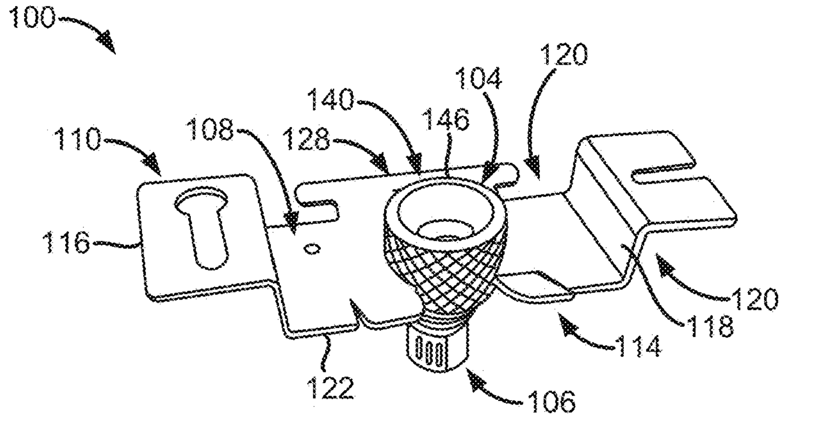
FIG. 1B illustrates one embodiment of the pendant light mounting assembly in an assembled configuration.
Figure 1C:
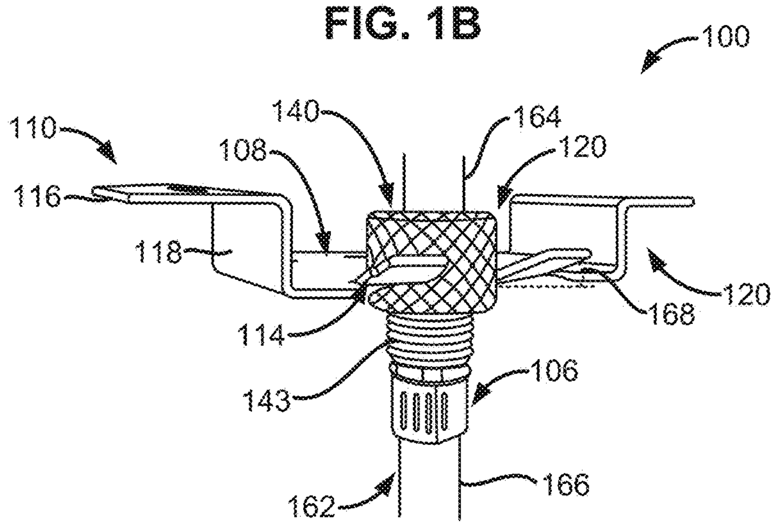
FIG. 1C illustrates a perspective view of the pendant light mounting assembly in the assembled configuration.

In the embodiments shown in FIGS. 1A-1C, the distal arm segment 116 can be oriented substantially parallel to the bracket lower plate 108. The distal arm segment 116 can also be positioned vertically above the bracket lower plate 108 to create a clearance space 120 to allow at least part of the hanger 104 to slide into the U-shaped slot 112 and to freely hang from the mounting bracket 102. The clearance space 120 created by the distal arm segment 116 positioned vertically above the bracket lower plate 108 can also allow an excess segment of a pendant light cord 162 (see, e.g., FIG. 1C or FIG. 3B) to be wrapped around an outside of the mounting bracket 102 such that the excess segment of the pendant light cord 162 is hidden from view or able to be tucked into a pendant light canopy 406 (see, e.g., FIG. 4A, FIG. 5A, or FIG. 5B) coupled to the pendant light mounting assembly 100.

The bracket lower plate 108 can have a plate front side 122, a plate rear side 124 opposite the plate front side 122, and plate lateral sides 126. The brackets arms 110 of the mounting bracket 102 can extend from the plate lateral sides 126 of the bracket lower plate 108.

The bracket lower plate 108 can further comprise a plate tail 128 extending from the plate rear side 124. In some embodiments, the plate tail 128 can be a substantially T-shaped 6 portion extending from the plate rear side 124 of the bracket lower plate 108. The plate tail 128 and at least one of the inclined tabs 114 can be configured or designed to allow an excess segment 164 of a pendant light cord 162 (see, e.g., FIG. 1C and FIG. 3B) extending out of a top of the hanger 104 to be wrapped around an exterior or outside of the mounting bracket 102. For example, the plate tail 128 and at least one of the inclined tabs 114 can physically support or hold the excess segment 164 of the pendant light cord 162 when the excess segment 164 is wrapped around the exterior or the outside of the mounting bracket 102.

As shown in FIG. 1A, the bracket lower plate 108 of the mounting bracket 102 can comprise a substantially U-shaped slot 112 comprising a widened open end 130 and a semicircular closed end 132 opposed the widened open end 130. The widened open end 130 can have an open end width 134 and the semicircular closed end 132 can have a closed end diameter 136.

In some embodiments, the open end width 134 (at its maximum) can be between about 18.0 mm to about 24.0 mm (e.g., about 21.0 mm). In some embodiments, the closed end diameter 136 can be between about 14.0 mm to about 18.0 mm (e.g., about 16.0 mm).

The open end width 134 can be greater than the closed end diameter 136. In some embodiments, a ratio of the closed end diameter 136 and the open end width 134 can be between about 1:1.25 and 1:1.50 (e.g., about 1:1.31).

Each of the two inclined tabs 114 can have a laterally inward side 138. The widened open end 130 of the U-shaped slot 112 can be defined by the laterally inward sides 138 of the pair of inclined tabs 114 that flare out or diverge. For example, terminal ends of the laterally inward sides 138 can curve radially outward or part of the terminal ends of the laterally inward sides 138 of the inclined tabs 114 can be cut away or sanded down. The widened open end 130 of the U-shaped slot 112 can allow the hanger 104 to slide into the substantially U-shaped slot 112 more easily.

The hanger 104 can comprise a hanger top portion 140 and a hanger bottom portion 142. The hanger bottom portion 142 can be defined by an exterior hanger threaded portion 143. The exterior hanger threaded portion 143 can allow a securement knob 408 (see, e.g., FIG. 4A, FIG. 5C, or FIG. 5D) to be screwed onto the hanger bottom portion 142 to secure a pendant light canopy 406 (see, e.g., FIG. 4A, FIG. 5A, or FIG. 5B) to the hanger 104. In an alternative embodiment, the exterior hanger threaded portion 143 can allow a decorative pendant canopy 520 (see, e.g., FIG. 5E or FIG. 5F) to be screwed directly onto the hanger bottom portion 142.

The hanger 104 can further comprise a hanger channel 144 or conduit extending 8 longitudinally through the hanger 104. A bottom segment of the hanger channel 144 can be a threaded inner channel 152.

The hanger top portion 140 can comprise a hanger head 146, a hanger skirt 148, and a hanger groove 150 defined vertically in between the hanger head 146 and the hanger skirt 148. As will be discussed in more detail in the following sections, the hanger groove 150 only partially extends around a circumference or periphery of the hanger top portion 140.

As shown in FIG. 1A, the strain relief 106 can comprise a strain relief base 154, an exterior threaded portion 156 extending distally from or otherwise connected to the strain relief base 154, a plurality of gripping flaps 158 extending distally from or otherwise connected to the exterior threaded portion 156. The strain relief 106 can also comprise a strain relief channel 160 extending longitudinally through the entirety of the strain relief 106 including the strain relief base 154, the exterior threaded portion 156, and the plurality of gripping flaps 158.

The strain relief channel 160 can be configured to receive or accommodate a pendant light cord 162 (see, e.g., FIG. 1C, FIG. 3B, or FIG. 4A) of the pendant light 400. The pendant light cord 162 can be thread or introduced through the strain relief channel 160 such that the strain relief 106 completely surrounds or rings around a segment of the pendant light cord 162.

As will be discussed in more detail in the following sections, the plurality of gripping flaps 158 can be configured to clamp onto or pinch the segment of the pendant light cord 162 when the exterior threaded portion 156 is screwed into at least part of the threaded inner channel 152.

The mounting bracket 102 can be made in part of a metallic material or a fire-resistant polymeric material. In some embodiments, the mounting bracket 102 can be made in part of steel, stainless steel, aluminum, or an alloy thereof. In alternative embodiments, the mounting bracket 102 can be made in part of a fire-resistant polymeric material (e.g., fire-resistant acrylonitrile butadiene styrene).

The hanger 104 can be made in part of a metallic material or a fire-resistant polymeric material. In some embodiments, the hanger 104 can be made in part of steel, stainless steel, aluminum, or an alloy thereof.

The strain relief 106 can be made in part of a polymeric material. In some embodiments, the strain relief 106 can be made of a polyamide (e.g., Nylon).

FIG. 1B illustrates a perspective view of one embodiment of the pendant light mounting assembly 100 in an assembled configuration. In the assembled configuration, the hanger 104 is detachably secured to and hung from the mounting bracket 102 and the strain relief 106 is screwed into at least part of the threaded inner channel 152 of the hanger 104. To achieve the assembled configuration, the hanger top portion 140 is slid into the substantially U-shaped slot 112 of the bracket lower plate 108 of the mounting bracket 102 via the hanger groove 150.

When the hanger top portion 140 is slid into the substantially U-shaped slot 112, the two inclined tabs 114 of the bracket lower plate 108 can prevent the hanger 104 from inadvertently sliding out of the substantially U-shaped slot 112 or from being inadvertently dislodged from the substantially U-shaped slot 112 when the hanger 104 hangs from the bracket lower plate 108 of the mounting bracket 102.

FIG. 1C illustrates another perspective view of the pendant light mounting assembly 100 in the assembled configuration with a pendant light cord 162 extending through the hanger 104 and the strain relief 106 and the pendant light cord 162 gripped by the strain relief 106.

FIG. 1C also illustrates that the pendant light cord 162 can comprise an excess segment 164 and a proximal cord segment 166. The excess segment 164 can refer to a segment of the pendant light cord 162 that extends out from an opening (e.g., at a distal end of the hanger channel 144) at the hanger top portion 140. The excess segment 164 of the pendant light cord 162 can be wrapped around an exterior or outside of the mounting bracket 102 to allow the excess segment 164 to fit within the pendant light canopy 406 (see, e.g., FIG. 5A or FIG. 5B).

The proximal cord segment 166 can be a segment of the pendant light cord 162 that is disposed proximal to the segment gripped by the strain relief 106. A proximal end of the proximal cord segment 166 can be connected or otherwise coupled to a light socket of the pendant light 400. The proximal cord segment 166 can hang straight down when the mounting bracket 102 is mounted to a ceiling junction box and the hanger 104 is securely hung from the mounting bracket 102.

As previously discussed, the two inclined tabs 114 of the bracket lower plate 108 can prevent the hanger 104 from inadvertently sliding out of the substantially U-shaped slot 112 or from being inadvertently dislodged from the substantially U-shaped slot 112 when the hanger 104 is hung from the bracket lower plate 108 of the mounting bracket 102.

Each of the two inclined tabs 114 can be angled upward relative to the bracket lower plate 108. In some embodiments, each of the two inclined tabs 114 can be angled upward relative to the bracket lower plate 108 at a tab angle 168 between about 15 degrees and 35 degrees. In other embodiments, each of the two inclined tabs 114 can be angled upward relative to the bracket lower plate 108 at a tab angle 168 between about 18 degrees and 20 degrees. In further embodiments, each of the two inclined tabs 114 can be angled upward relative to the bracket lower plate 108 at a tab angle 168 between about 25 degrees and 28 degrees.

FIGS. 1B and 1C also illustrate that the portions of the bracket lower plate 108 surrounding the substantially U-shaped slot 112 and the laterally inward sides 138 of the two inclined tabs 114 can be the only parts of the mounting bracket 102 that hold up the hanger head 146 when the hanger 104 securely hangs from the mounting bracket 102.

FIG. 1C also illustrates that each of the bracket arms 110 can be shaped as a staircase step such that the proximal arm segment 118 is oriented substantially perpendicular to the bracket lower plate 108 and the distal arm segment 116. The distal arm segment 116 can be oriented substantially parallel to the bracket lower plate 108.

Figure 2A:
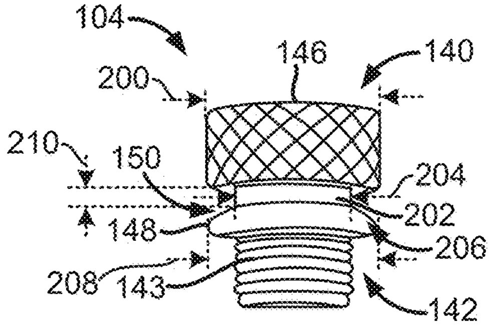
FIG. 2A illustrates a front view of a hanger of the pendant light mounting assembly.

FIG. 2A illustrates a front view of a hanger 104 of the pendant light mounting assembly 100. The front side of the hanger top portion 140 can comprise the hanger head 146, the hanger skirt 148, and part of the hanger groove 150 separating the hanger head 146 from the hanger skirt 148.

The hanger head 146 can be substantially shaped as a cylinder. The hanger head 146 can have a head diameter 200. The head diameter 200 can be between about 20.0 mm and 24.0 mm (e.g., about 22.0 mm).

As shown in FIG. 2A, the hanger groove 150 can reduce a diameter of the hanger top portion 140 where the hanger groove 150 is defined. This portion of the hanger top portion 140 can be referred to as a hanger neck 202. The hanger neck 202 can be substantially shaped as a cylinder disposed radially inward of the hanger groove 150.

The hanger neck 202 can have a neck diameter 204. The neck diameter 204 can be between about 14.0 mm and 18.0 mm (e.g., about 16.0 mm). A ratio of the head diameter 200 to the neck diameter 204 of the hanger 104 can be between about 1.33:1 to 1.70:1 (e.g., about 1.38:1).

FIG. 2A illustrates that immediately below the hanger neck 202 can be the hanger skirt 148. The hanger skirt 148 can be shaped as a flattened frustoconic comprising a conically sloped portion 206. The hanger groove 150 can extend down to the conically sloped portion 206.

The hanger skirt 148 can have a skirt maximum diameter 208. The skirt maximum diameter 208 can be between about 21.0 mm and 25.0 mm (e.g., about 23.0 mm). A ratio of the head diameter 200 to the skirt maximum diameter 208 can be between about 1:1 to 1:1.25 (e.g., about 1:1.045). Moreover, a ratio of the skirt maximum diameter 208 to the neck diameter 204 can be between about 1.17:1 to 1.78:1 (e.g., about 1.44:1).

FIG. 2A also illustrates that the hanger groove 150 can have a groove height 210. The groove height 210 can be between about 2.5 mm to about 4.5 mm (about 3.0 mm). The groove height 210 can be greater than a thickness of the bracket lower plate 108 to allow the hanger 104 to more easily slide into the U-shaped slot 112. For example, the thickness of the bracket lower plate 108 can be about 1.0 mm. The unique shape of the hanger groove 150, which extends from a bottom of the hanger head 146 down to the conically sloped portion 206 of the hanger skirt 148, also allows the hanger to more easily slide into the U-shaped slot 112.

The hanger bottom portion 142 can be defined by the exterior hanger threaded portion 143. As will be discussed in more detail in the following sections, the exterior hanger threaded portion 143 can allow a securement knob 408 (see, e.g., FIG. 4A, FIG. 5C, or FIG. 5D) to be screwed onto the hanger bottom portion 142 to secure a pendant light canopy 406 (see, e.g., FIG. 4A, FIG. 5A, or FIG. 5B) to the hanger 104. In an alternative embodiment, the exterior hanger threaded portion 143 can allow a decorative pendant canopy 520 (see, e.g., FIG. 5E or FIG. 5F) to be screwed directly onto the hanger bottom portion 142.

Figure 2B:
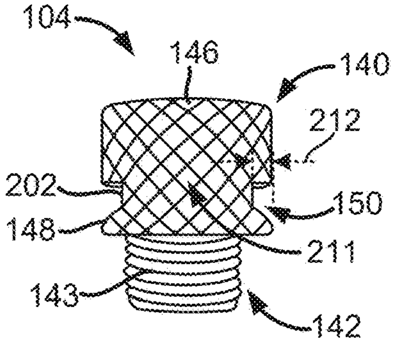
FIG. 2B illustrates a rear view of the hanger.

FIG. 2B illustrates a rear view of the hanger 104. As shown in FIG. 2B, the hanger groove 150 only partially extends around a circumference or periphery of the hanger top portion 140 (see also, e.g., FIG. 2C, FIG. 2D, or FIG. 2E).

In some embodiments, the hanger groove 150 extends between 250 degrees and 300 degrees around the circumference or periphery of the hanger top portion 140. In other embodiments, the hanger groove 150 extends between 300 degrees and 320 degrees around the circumference or periphery of the hanger top portion 140.

For example, as shown in FIG. 2B, the hanger top portion 140 comprises a rear portion 211 where the hanger groove 150 does not reach. Along this rear portion 211, the hanger head and the hanger skirt 148 is completely connected or contiguous with one another.

This unique design of the hanger 104 having a hanger groove 150 that does not extend completely (360 degrees) around the circumference or periphery of the hanger top portion 140 allows the hanger 104 to easily slide into the substantially U-shaped slot 112 of the mounting bracket 102 but prevents the hanger 104 from rotating about its longitudinal axis when hung from the mounting bracket 102. This design allows the strain relief 106 to be more easily screwed into the hanger bottom portion 142 and allows the securement knob 408 (see, e.g., FIG. 4A, FIG. 5C, or FIG. 5D) or the decorative pendant canopy 520 (see, e.g., FIG. 5E or FIG. 5F) to more easily be screwed onto the exterior hanger threaded portion 143 when the hanger is hung from the mounting bracket 102.

FIG. 2B also illustrates that the hanger groove 150 can have a groove radial depth 212. The groove radial depth 212 can be a maximum radial depth of the hanger groove 150 as measured from the hanger neck 202 to a lateral outer surface of the hanger head 146. In some embodiments, the groove radial depth 212 can be between about 3.0 mm to about 5.0 mm (e.g., about 3.25 mm).

FIGS. 2A and 2B also illustrate that an exterior surface of the hanger top portion 140 can be defined by or otherwise covered by a tactilely-responsive (i.e., grip-friendly) surface texture. For example, the tactilely-responsive surface texture can comprise a lattice pattern, an argyle pattern, or a crisscross pattern carved or otherwise cut into the exterior surface of the hanger top portion 140 including the hanger head 146 and at least part of the hanger skirt 148. The tactilely-responsive surface texture allows an installer to more easily grip onto the hanger 104 during the installation procedure.

Figure 2C:
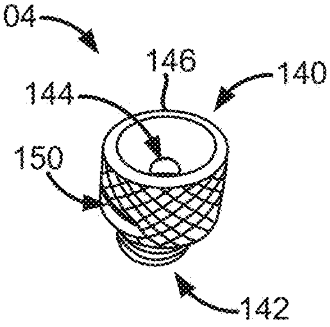
FIG. 2C illustrates a perspective view of a top of the hanger.

FIG. 2C illustrates a perspective view of a top of the hanger 104 showing a top opening of the hanger channel 144 or conduit. As previously discussed, the hanger channel 144 or conduit can extend longitudinally through the hanger 104. Moreover, as previously discussed, an excess segment 164 of the pendant light cord 162 can extend out from the top opening of the hanger channel 144 (see, e.g., FIG. 1C).

Figure 2D:
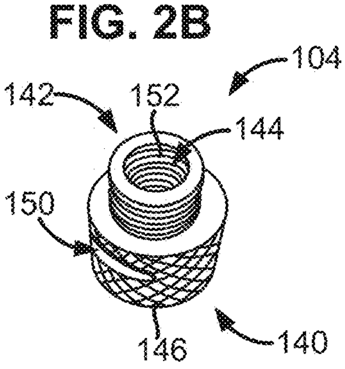
FIG. 2D illustrates a perspective view of a bottom of the hanger.

FIG. 2D illustrates a perspective view of a bottom of the hanger 104 showing a bottom opening of the hanger channel 144 or conduit. As shown in FIG. 2D, at least a segment of the hanger channel 144 near the bottom opening can be a threaded inner channel 152 that can receive an exterior threaded portion 156 of the strain relief 106.

FIGS. 2C and 2D also illustrate that the hanger channel 144 can be tapered or substantially conical in shape such that a diameter of the hanger channel 144 at the hanger bottom portion 142 is greater than a diameter of the hanger channel 144 at the hanger top portion 140. The tapered shape of the hanger channel 144 can force or otherwise compel the plurality of gripping flaps 158 of the strain relief 106 to clamp onto or otherwise tightly grip or pinch a pendant light cord 162 extending through the strain relief channel 160 when the exterior threaded portion 156 of the strain relief 106 is screwed into the threaded inner channel 152 of the hanger 104.

Figure 2E:
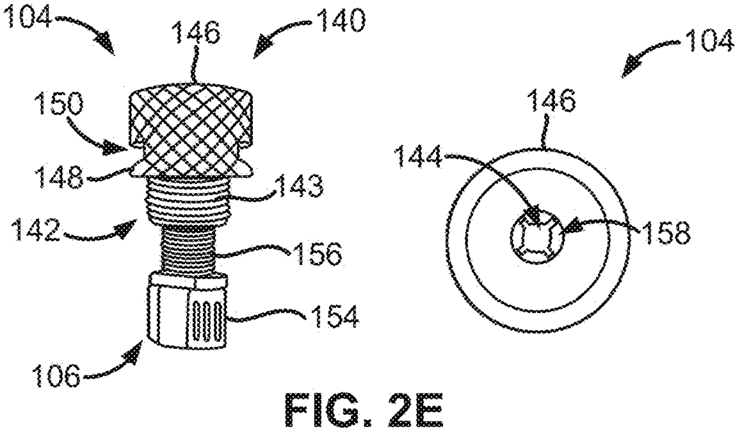
FIG. 2E illustrates a sub-assembly comprising a strain relief of the pendant light mounting assembly partially screwed into a bottom of the hanger and a top plan view of the sub-assembly when the strain relief is partially screwed into the bottom of the hanger.

FIG. 2E illustrates a sub-assembly comprising the strain relief 106 partially screwed into a bottom of the hanger 104 (the hanger bottom portion 142) and a top plan view of the sub-assembly when the strain relief 106 is partially screwed into the bottom of the hanger 104. As shown in the top plan view of FIG. 2E, the gripping flaps 158 of the strain relief 106 can be in their undisturbed or natural configuration where the plurality of gripping flaps 158 (e.g., between three to four gripping flaps 158) are slightly separated from one another.

Figure 2F:
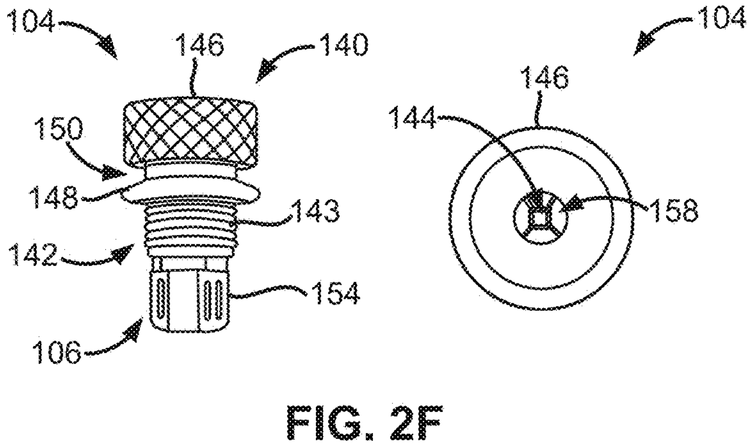
FIG. 2F illustrates the sub-assembly comprising the strain relief completely screwed into the bottom of the hanger and a top plan view of the sub-assembly when the strain relief is completely screwed into the bottom of the hanger.

FIG. 2F illustrates the same sub-assembly shown in FIG. 2E with the strain relief 106 completely screwed into the bottom of the hanger 104 (the hanger bottom portion 142) and a top plan view of the sub-assembly when the strain relief 106 is completely screwed into the bottom of the hanger 104. As shown in the top plan view of FIG. 2F, the gripping flaps 158 of the strain relief 106 are now pushed or forced together by the tapered hanger channel 144. When the strain relief channel 160 defined by the gripping flaps 158 is occupied by a segment of the pendant light cord 162, this segment of the pendant light cord 162 can be gripped, pinched, or clamped tightly by the gripping flaps 158 such that the pendant light cord 162 is no longer translatable or pullable through the strain relief 106 or hanger 104.

Figure 4A:
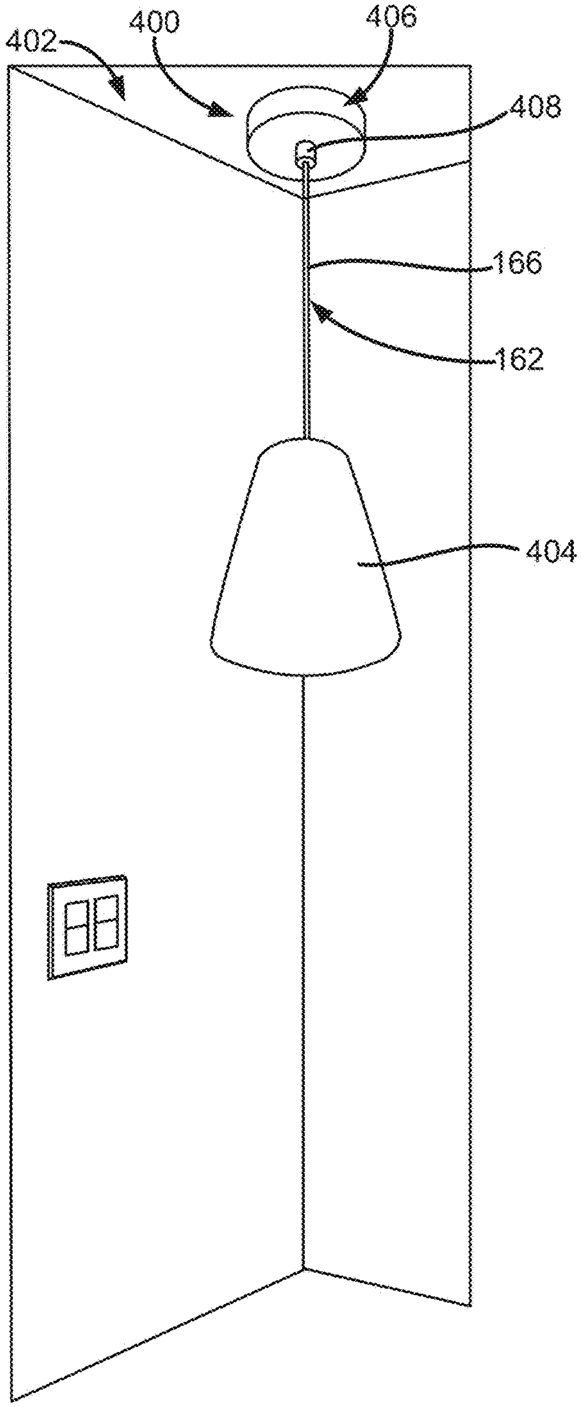
FIG. 4A illustrates one embodiment of a pendant light mounted to a ceiling using the pendant light mounting assembly.

An installer can completely screw the strain relief 106 into the bottom of the hanger 104 when the installer has settled on a desired length for the proximal cord segment 166 of the pendant light cord 162 (see, e.g., FIG. 4A).

FIG. 3A illustrates a mounting bracket 102 of the pendant light mounting assembly 100 coupled to a ceiling junction box 300 or ceiling electrical box. The mounting bracket 102 can be coupled to the ceiling junction box 300 via a plurality of fasteners 302 (e.g., screws). Cutouts (e.g., keyhole cutouts) and apertures/openings defined along the bracket arms 110 can allow the fasteners 302 to be screwed into various receptacles or positions along the ceiling junction box 300.

FIG. 3A also illustrates that the ceiling junction box 300 can comprise a plurality of electrical wires 304 for connecting to electrical wires of the pendant light 400. The plurality of electrical wires 304 can comprise a hot/live wire (usually colored black), a neutral wire (usually colored white), and a ground wire (usually colored green). The electrical wires of the pendant light 400 can be contained or carried by the pendant light cord 162 and extend out of a distal end of the pendant light cord 162.

The pendant light mounting assembly 100 can allow a lone installer to more easily connect the electrical wires from the pendant light 400 to the plurality of electrical wires 304 extending from the ceiling junction box 300. For example, the installer can thread the pendant light cord 162 through the strain relief channel 160 and the hanger channel 144 and partially screw the strain relief 106 into the threaded inner channel 152 of the hanger 104. The installer can then slide the hanger 104 into the substantially U-shaped slot 112 of the mounting bracket to temporarily hold the hanger 104 while the installer adjusts the pendant light cord 162. The pendant light mounting assembly 100 can also allow a lone installer to pull the excess segment 164 of the pendant light cord 162 through the top of the hanger head 146 until the installer obtains a desired length of the proximal cord segment 166 (based on how far the installer wants the pendant light 400 to hang down).

The installer can then finish screwing the strain relief 106 into the threaded inner channel 152 of the hanger 104 to make the gripping flaps 158 grip tightly onto the pendant light cord 162. The installer can then wrap the excess segment 164 of the pendant light cord 162 around the outside or exterior of the mounting bracket 102 so that the pendant light canopy 406 can hide the pendant light mounting assembly 100 and the excess segment 164 of the pendant light cord 162.

FIG. 3B illustrates the pendant light mounting assembly 100 in an assembled configuration with the excess segment 164 of the pendant light cord 162 wrapped around the mounting bracket 102 coupled to the ceiling junction box 300. The excess segment 164 of the pendant light cord 162 can be a segment of the pendant light cord 162 that was not used to hang the pendant light 400 (more specifically, the light socket, light bulb, light shade, and shade holder of the pendant light 400) in free space.

As previously discussed, the plate tail 128 and at least one of the inclined tabs 114 can physically support or hold the excess segment 164 of the pendant light cord 162 when the excess segment 164 is wrapped around the exterior or the outside of the mounting bracket 102.

FIG. 3B also illustrates that the strain relief 106 is fully screwed into the hanger bottom portion 142 of the hanger 104 to compel the gripping flaps 158 (see, e.g., FIG. 1A) of the strain relief 106 to grip onto the pendant light cord 162.

FIG. 4A illustrates one embodiment of a pendant light 400 mounted to a ceiling 402 using the pendant light mounting assembly 100 (see, e.g., FIG. 1A, FIG. 1B, FIG. 1C, or FIG. 3B). The pendant light 400 can be a light fixture designed to be mounted to the ceiling 402 via a pendant light cord 162 (see also, e.g., FIG. 3B or FIG. 1C). In some embodiments, the pendant light cord 162 can refer to an outer tube or sheath (e.g., a flexible polymeric tube) encompassing, carrying, or otherwise comprising electrical wires extending through a lumen of the tube or sheath. The electrical wires can be connected to a pendant light socket at a distal end of the pendant light cord 162. The electrical wires extending through the pendant light cord 162 (the light socket wires) can be configured to be connected to electrical wires 304 (see, e.g., FIG. 3A) from a ceiling junction box 300. In certain embodiments, the outer tube or sheath serving as the pendant light cord 162 can also comprise one or more chains, cables, or supporting wires. In further embodiments, the pendant light cord 162 can refer to insulated electrical wires intertwined or braided with one or more chains, cables, or supporting wires without an outer sheath or tube covering the insulated electrical wires or chains/cables/supporting wires. In these embodiments, the entire intertwined or braided segment of wires, chains, and/or cables can be referred to as the pendant light cord 162.

FIG. 4A also illustrates that the pendant light 400 can comprise a pendant light shade 404 or lamp shade and a pendant light socket (not shown in the figures). The pendant light shade 404 can also refer to a pendant light diffuser (either built-in to the pendant light shade 404 or coupled to the pendant light shade 404).

As previously discussed, the pendant light socket can be disposed at or connected to a distal or bottom end of the pendant light cord 162. The pendant light socket can be connected to electrical wires that extend through the entire length of the pendant light cord 162 and are exposed at a proximal end of the pendant light cord 162. These electrical wires can be connected by an installer to electrical wires 304 (see, e.g., FIG. 3A) that extend from the ceiling junction box 300 to make the pendant light 400 operable.

In some embodiments, the pendant light socket can be an E26 light socket for receiving an E26-type bulb (e.g., an E26 light-emitting diode (LED) bulb) or an E12 light socket for receiving an E12-type bulb (e.g., an E12 LED bulb). In other embodiments, the pendant light socket can receive another type of light bulb such as an incandescent light bulb, a compact fluorescent light bulb, or any other type of light bulb configured to be mated to the pendant light socket.

The pendant light shade 404, the pendant light socket, and/or the pendant light cord 162 can be any type of generic or off-the-shelf component since the pendant light mounting assembly 100 will work with almost all types of pendant light shades, pendant light sockets, and/or pendant light cords 162 as long as the pendant light cord 162 (including the electrical wires connected to the pendant light socket) can fit within the strain relief channel 160 and the hanger channel 144. In this sense, one technical advantage of the pendant light mounting assembly 100 disclosed herein is that the pendant light mounting assembly 100 can be considered a universal mounting assembly that is compatible with most types of mountable pendant lights.

A method of mounting a pendant light (for example, the pendant light 400) can comprise fastening a mounting bracket 102 (see, e.g., FIG. 1A, FIG. 1B, FIG. 1C, FIG. 3A, or FIG. 3B) to a ceiling junction box 300 (see, e.g., FIG. 3A or FIG. 3B). The mounting bracket 102 can comprise a bracket lower plate 108, a U-shaped slot 112 defined along part of the bracket lower plate 108, and two inclined tabs 114 extending from the bracket lower plate 108 (see, e.g., FIG. 1A, FIG. 1B, FIG. 1C, FIG. 3A, or FIG. 3B). The method can also comprise sliding a hanger 104 down the two inclined tabs 114 into the U-shaped slot 112 to hang the hanger 104 from the mounting bracket 102 (see, e.g., FIG. 1C or FIG. 3B). The method can further comprise screwing a strain relief 106 into a threaded inner channel 152 of the hanger 104 to clamp or pinch the strain relief 106 to a segment of a pendant light cord 162 (see, e.g., FIG. 2E and FIG. 2F) connected to the pendant light 400 to hang the pendant light 400 from the mounting bracket 102 mounted to the ceiling junction box 300 on the ceiling 402.

In some embodiments, the pendant light mounting assembly 100 can further comprise a pendant light canopy 406 and a securement knob 408 for securing the pendant light canopy 406 to the ceiling 402 via the hanger 104 hung from the mounting bracket 102. The pendant light canopy 406 and the securement knob 408 will be discussed in more detail in relation to FIG. 5A, FIG. 5B, FIG. 5C, and FIG. 5D.

Although not shown in FIG. 4A, in certain embodiments, a decorative pendant canopy 520 can replace or be used in lieu of the pendant light canopy 406 and the securement knob 408. In these embodiments, the pendant light mounting assembly 100 can further comprise the decorative pendant canopy 520. The decorative pendant canopy 520 will be discussed in more detail in relation to FIG. 5E and FIG. 5F.

Figure 4B:
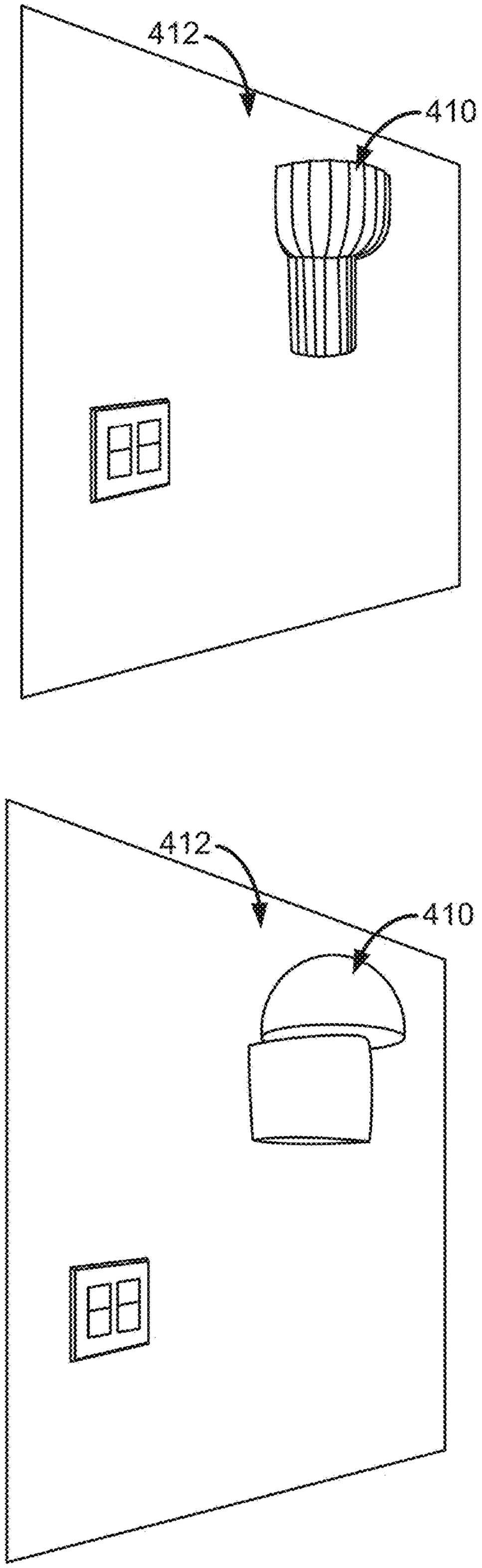
FIG. 4B illustrates several embodiments of wall-mounted light fixtures or sconces mounted using a flush mount assembly.

FIG. 4B illustrates two embodiments of flush mount lights 410 mounted using a flush mount assembly 800 (see, e.g., FIG. 8B, FIG. 8C, FIG. 9A, FIG. 12A, FIG. 13A, or FIG. 13B). Although FIG. 4B illustrates two examples of light fixtures mounted flush with a wall 412 (also referred to as sconces), the flush mount assembly 800 disclosed herein can also be used to mount a ceiling flush mount light. Mounting the ceiling flush mount light will be discussed in more detail in relation to FIG. 13A and FIG. 13B.

For purposes of this disclosure, the term flush mount lights 410 can refer to a sconce or a ceiling flush mount light.

As will be discussed in more detail in the following sections, the flush mount assembly 800 can comprise a mounting bracket 700 mounted to the wall 412 and a mountable enclosure 742 configured to be coupled to at least part of the flush mount light 410 (e.g., the sconce or ceiling flush mount light). When the mountable enclosure 742 is coupled to at least part of the flush mount light 410, the mountable enclosure 742 coupled to the flush mount light 410 can be hooked onto the mounting bracket 700 and the mountable enclosure 742 can be rotated toward the mounting bracket 700 to be fastened to the mounting bracket 700 mounted to the wall 412 (see, e.g., FIG. 8B or FIG. 9B).

Figure 5A:
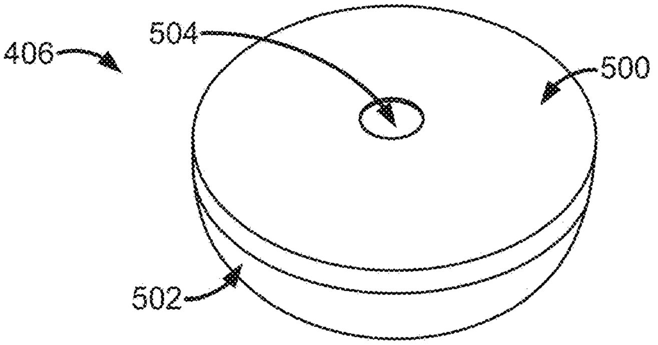
FIG. 5A illustrates one embodiment of a pendant light canopy configured to be detachably coupled to a hanger of the pendant light mounting assembly.

FIG. 5A illustrates one embodiment of a pendant light canopy 406 configured to be detachably coupled to the hanger 104 (see, e.g., FIG. 1A, FIG. 1B, FIG. 1C, or FIG. 3B). In some embodiments, the pendant light canopy 406 can be considered part of the pendant light mounting assembly 100.

In some embodiments, the pendant light canopy 406 can be substantially shaped as a flattened cylindrical bowl or vessel. In other embodiments, the pendant light canopy 406 can be substantially shaped as an open box or a truncated polyhedron or prism.

FIG. 5A illustrates that the pendant light canopy 406 can comprise an underside 500 and canopy lateral walls 502. FIG. 5A also illustrates that a canopy opening 504 can be defined in a center of the underside 500 of the pendant light canopy 406.

Figure 5B:
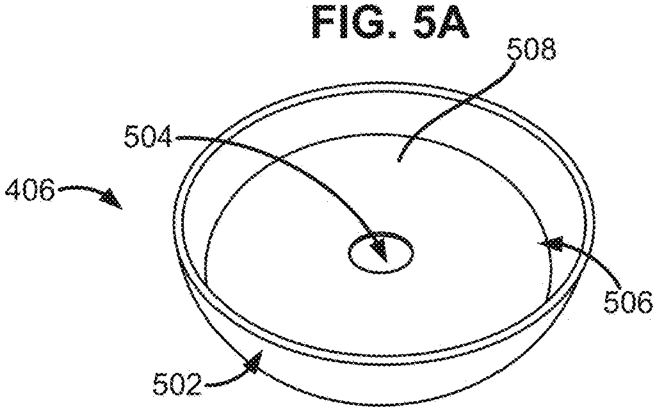
FIG. 5B illustrates one embodiment of a canopy cavity of the pendant light canopy of FIG. 5A.

FIG. 5B illustrates one embodiment of a canopy cavity 506 of the pendant light canopy 406 when the pendant light canopy 406 is turned upright. The canopy cavity 506 can be configured to house or enclose the various electrical wires, the excess segment 164 of the pendant light cord 162, and the remainder of the pendant light mounting assembly 100 including the mounting bracket 102 and at least part of the hanger 104.

FIG. 5B also illustrates that the pendant light canopy 406 can also comprise a hanger contact surface 508. The hanger contact surface 508 can be the opposite side of the underside of the pendant light canopy 406. The canopy lateral walls 502 can extend upward from the hanger contact surface 508. The canopy lateral walls 502 and the hanger contact surface 508 can define the canopy cavity 506.

As shown in FIGS. 5A and 5B, the canopy opening 504 can extend all the way through to the hanger contact surface 508. The canopy opening 504 can allow at least part of the securement knob 408 to extend into the canopy cavity 506 to be screwed onto the hanger bottom portion 142. The securement knob 408 can be screwed onto the hanger bottom portion 142 to secure the pendant light canopy 406 to the hanger 104 and the ceiling 402 (see, e.g., FIG. 4A).

The pendant light canopy 406 can be made in part of a metallic material or a fire-resistant polymeric material. In some embodiments, the pendant light canopy 406 can be made in part of steel, stainless steel, aluminum, or an alloy thereof. In alternative embodiments, the pendant light canopy 406 can be made in part of a fire-resistant polymeric material.

Figure 5C:
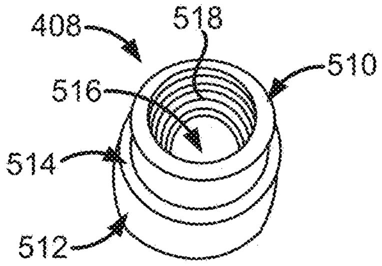
FIG. 5C illustrates one embodiment of a top of a securement knob used to fasten the pendant light canopy to the hanger of the pendant light mounting assembly.

FIG. 5C illustrates one embodiment of a top of a securement knob 408 that can be used to fasten the pendant light canopy 406 to the hanger 104 and the ceiling 402 (see, e.g., FIG. 4A). In some embodiments, the securement knob 408 can be considered part of the pendant light mounting assembly 100.

As shown in FIG. 5C, the securement knob 408 can comprise a knob top 510, a knob base 512 comprising a knob rim 514 extending radially past the knob top 510, and a knob lumen 516 extending longitudinally through the securement knob 408. The knob lumen 516 of the securement knob 408 can receive or accommodate a segment of the pendant light cord 162.

At least part of the knob lumen 516 can be a threaded lumen 518. The thread pattern of the threaded lumen 518 can be compatible or otherwise able to mate with a thread pattern of the exterior hanger threaded portion 143 of the hanger bottom portion 142. This can allow the securement knob 408 to be screwed onto the exterior hanger threaded portion 143 of the hanger bottom portion 142.

In some embodiments, the pendant light canopy 406 and the securement knob 408 can be installed by both being thread, strung, or otherwise placed onto the pendant light cord 162 at the same time as the hanger 104 and the strain relief 106. The pendant light canopy 406 and the securement knob 408 can initially be allowed to freely hang while the hanger 104 is detachably coupled to the mounting bracket 102 (i.e., the hanger top portion 140 is slid into the U-shaped slot 112 and hung from the mounting bracket 102) and the strain relief 106 is screwed into the hanger 104. Once the excess segment 164 of the pendant light cord 162 is wrapped around the mounting bracket 102 or otherwise collected/gathered, the pendant light canopy 406 can be pushed against the ceiling 402 (see, e.g., FIG. 4A) and the canopy cavity can house or otherwise enclose the various electrical wires, the excess segment 164 of the pendant light cord 162, the mounting bracket 102, and at least part of the hanger 104.

At this point, at least part of the securement knob 408 (the knob top 510) can be introduced into the canopy cavity 506 through the canopy opening 504. With at least part of the knob top 510 extending into the canopy cavity 506, the threaded lumen 518 of the securement knob 408 can allow the knob top 510 to be screwed onto the exterior hanger threaded portion 143 of the hanger bottom portion 142. When the knob top 510 is being screwed onto the exterior hanger threaded portion 143 of the hanger bottom portion 142, the knob rim 514 at the top of the knob base 512 can push against part of the underside 500 of the pendant light canopy 406 and the hanger contact surface 508 can push against an underside of the hanger skirt 148 of the hanger 104. Once the securement knob 408 is fully screwed onto the hanger 104, the pendant light canopy 406 can be secured to the hanger 104 and the ceiling (see, e.g., FIG. 4A) by the securement knob 408.

Referring back to FIG. 4A, the pendant light canopy 406 can be secured to the hanger 104 and the ceiling 402 by being sandwiched in between the hanger skirt 148 and the securement knob 408 and pushed against the ceiling 402 by the securement knob 408.

One technical problem faced by the applicant is how to design a pendant light mounting assembly that can be used to mount various types of pendant lights without having to mount a custom-made mounting bracket to the ceiling each time. Another technical problem faced by the applicant is how to design a pendant light mounting assembly that can be easily installed or mounted by one person without special tools. Yet another technical problem faced by the applicant is how to design a pendant light mounting assembly that can allow an installer to easily adjust a length of a pendant light cord to raise or lower the pendant light post-installation. One technical solution discovered and developed by the applicant is the unique pendant light mounting assembly disclosed herein that addresses all of the aforementioned problems. The pendant light mounting assembly comprises a mounting bracket comprising a bracket lower plate and bracket arms configured to be mounted to a ceiling junction box. The mounting bracket is low profile and small and only requires a few screws to mount to a ceiling junction box. A U-shaped slot is defined along part of the bracket lower plate along with two inclined tabs that extend from the bracket lower plate and surround the U-shaped slot. A uniquely designed hanger can be slid down the two inclined tabs into the U-shaped slot to allow the hanger to securely hang from the mounting bracket. A strain relief positioned around (or thread onto) a pendant light cord can then be screwed into a bottom of the hanger to temporarily lock the pendant light cord into place. It has been discovered by the applicant that the geometries, shapes, and/or dimensions of the mounting bracket, hanger, and strain relief disclosed herein impart significant benefits that allow the pendant light mounting assembly to operate effectively.

One technical advantage provided by the pendant light mounting assembly disclosed herein is that an individual installer can perform any necessary wiring steps (i.e., connect the necessary electrical wires) while the hanger is hung from the mounting bracket and the strain relief is fully screwed into the hanger. By hanging the hanger from the mounting bracket during this crucial step, this frees up both of the installer's hands to undertake the important (and risky) wiring procedure. Once the wiring step is completed, the installer can loosen the strain relief and then pull the excess segment of the pendant light cord through the top of the hanger until a desired proximal cord segment of the pendant light cord is obtained. The installer can then completely screw the strain relief into the hanger to essentially lock the pendant light cord into place. If the installer wishes to adjust the length of the light cord to raise or lower the pendant light, the installer can unscrew the strain relief from the hanger to free the pendant light cord and once again adjust the length of the pendant light cord. If a user wishes to change the pendant light entirely, the user can disconnect the electrical wires while the hanger is hung from the mounting bracket and then easily lift the hanger off the mounting bracket once the electrical wires are disconnected. The user can then unscrew the strain relief from the hanger to free the pendant light cord and allow the pendant light cord to be retracted from the hanger and strain relief. A new pendant light can then be installed by repeating the above steps including introducing the pendant light cord of the new pendant light through a hanger channel of the hanger and a strain relief channel of the strain relief, hanging the hanger back on the mounting bracket, and screwing the strain relief back into the hanger. Moreover, another technical advantage of the pendant light mounting assembly is that the entire mounting bracket, hanger, and strain relief can all be covered by a simple pendant light canopy that can be secured to the hanger via a securement knob or an aesthetically pleasing decorative canopy.

Figure 5D:
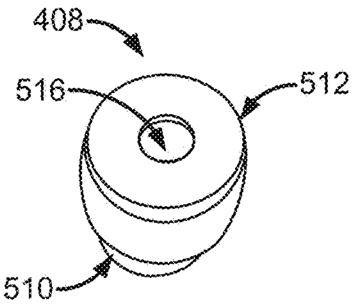
FIG. 5D illustrates one embodiment of a bottom of the securement knob of FIG. 5C.

FIG. 5D illustrates one embodiment of a bottom of the securement knob 408. As shown in FIG. 5D, the knob base 512 can be held or otherwise grasped by an installer when screwing the securement knob 408 onto the hanger 104. While the knob top 510 is sized to fit through the canopy opening 504, the knob base 512 including the knob rim 514 is sized to not fit through the canopy opening 504 such that the knob rim 514 pushes against the underside 500 of the pendant light canopy 406 while the securement knob 408 is being screwed onto the hanger 104.

Figure 5E:
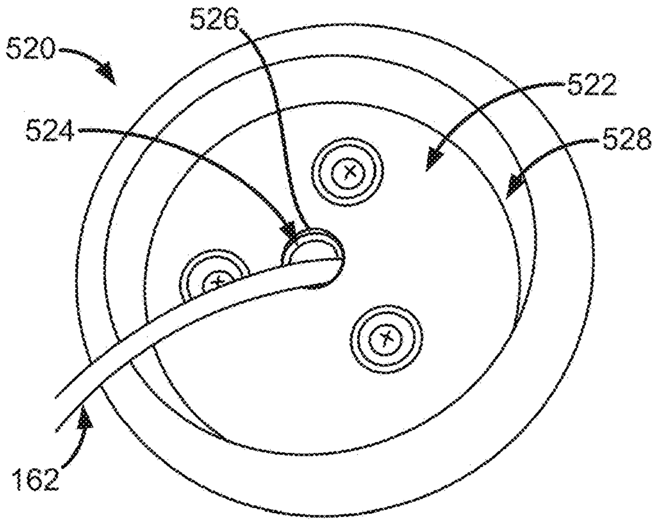
FIG. 5E illustrates one embodiment of a top of a decorative pendant canopy configured to be detachably coupled to the hanger of the pendant light mounting assembly.

FIG. 5E illustrates one embodiment of a top of a decorative pendant canopy 520 configured to be detachably coupled to the hanger 104. The decorative pendant canopy 520 can be used in lieu of the pendant light canopy 406 (see, e.g., FIG. 5A and FIG. 5B) and the securement knob 408 (see, e.g., FIG. 5C and FIG. 5D). In some embodiments, the decorative pendant canopy 520 can be considered part of the pendant light mounting assembly 100.

As shown in FIG. 5E, the decorative pendant canopy 520 can comprise a fire-proof enclosure 522, an enclosure opening 524 defined along part of the fire-proof enclosure 522, and a canopy threaded lumen 526 exposed by the enclosure opening 524. The fire-proof enclosure 522 can be fastened, affixed, or otherwise coupled to the remainder of the decorative pendant canopy 520 by mechanical fasteners such as screws.

The remainder of the decorative pendant canopy 520 can be made of a polymeric material, a metallic material, an organic material such as wood or wicker, or a combination thereof. In some embodiments, the remainder of the decorative pendant canopy 520 (the part of the decorative pendant canopy 520 not including the fire-proof enclosure 522) can be 3D-printed using a 3D-printing filament. For example, at least part of the decorative pendant canopy 520 can be 3D printed using a polylactic acid (PLA) filament, an acrylonitrile butadiene styrene (ABS) filament, a polyethylene terephthalate glycol (PETG) filament, a polyamide or Nylon filament, or a combination thereof.

In other embodiments, at least part of the decorative pendant canopy 520 can be 3D printed using a metal-infused material (e.g., copper, bronze, brass, or stainless steel infused 3D printing filament) and/or a wood-filled material (e.g., a PLA base material with wood dust, cork, or powdered wood derivatives infused into the base material). In alternative embodiments, at least part of the decorative pendant canopy 520 can be made using polycarbonate (PC).

In some embodiments, the fire-proof enclosure 522 can be substantially shaped as the pendant light canopy 406 (see, e.g., FIG. 5A and FIG. 5B). The fire-proof enclosure 522 can define an enclosure cavity 528. The enclosure cavity 528 can be sized to house or otherwise enclose the mounting bracket 102, the various electrical wires, the excess segment 164 of the pendant light cord 162, and at least part of the hanger 104.

As shown in FIG. 5E, the enclosure opening 524 can expose the canopy threaded lumen 526. The thread pattern of the canopy threaded lumen 526 can be compatible or otherwise able to mate with a thread pattern of the exterior hanger threaded portion 143 of the hanger bottom portion 142. This can allow the decorative pendant canopy 520 to be screwed directly onto the exterior hanger threaded portion 143 of the hanger bottom portion 142 to secure the decorative pendant canopy 520 to the hanger 104.

Figure 5F:
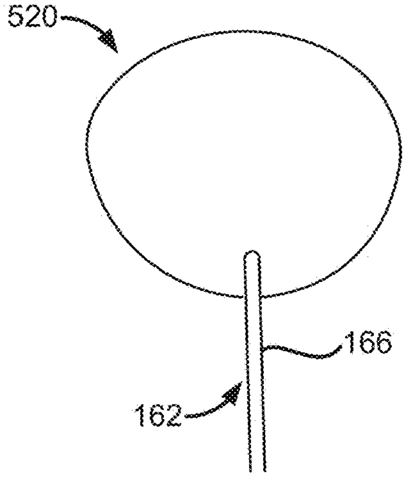
FIG. 5F illustrates a bottom perspective view of the decorative pendant canopy of FIG. 5E with a pendant light cord extending from a bottom of the decorative pendant canopy.

FIG. 5F illustrates a bottom perspective view of the decorative pendant canopy 520 with a proximal cord segment 166 of the pendant light cord 162 extending from the bottom of the decorative pendant canopy 520. As shown in FIG. 5F, when the decorative pendant canopy 520 is fully screwed onto the hanger 104 via the canopy threaded lumen 526, all that is visible is the bottom of the decorative pendant canopy 520 since the top of the decorative pendant 9 canopy 520 houses or encloses the mounting bracket 102, the hanger 104, the strain relief 106, the various electrical wires, and the excess segment 164 of the pendant light cord 162.

In some embodiments, the decorative pendant canopy 520 can be installed by being thread, strung, or otherwise placed onto the pendant light cord 162 at the same time as the hanger 104 and the strain relief 106. The decorative pendant canopy 520 can be initially allowed to freely hang while the hanger 104 is detachably coupled to the mounting bracket 102 (i.e., the hanger top portion 140 is slid into the U-shaped slot 112 and hung from the mounting bracket 102) and the strain relief 106 is screwed into the hanger 104. Once the excess segment 164 of the pendant light cord 162 is wrapped around the mounting bracket 102 or otherwise collected/gathered, the decorative pendant canopy 520 can be screwed onto the hanger bottom portion 142 to secure the decorative pendant canopy 520.

Figure 6A:
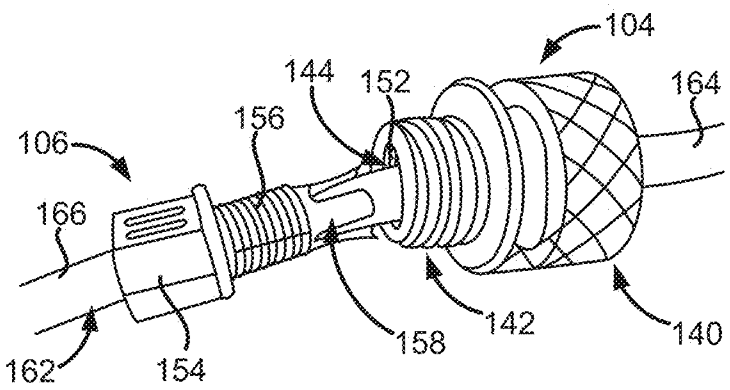
FIG. 6A illustrates one embodiment of a strain relief loosely threaded onto a pendant light cord and about to be screwed into a bottom of the hanger.

FIG. 6A illustrates the strain relief 106 loosely threaded onto the pendant light cord 162 and about to be screwed into the hanger bottom portion 142 of the hanger 104 to coerce the 22 gripping flaps 158 of the strain relief 106 to grip tightly onto the pendant light cord 162.

As shown in FIG. 6A, the hanger 104 can comprise a hanger channel 144 or conduit extending longitudinally through the entirety of the hanger 104. A bottom segment of the hanger channel 144 can be a threaded inner channel 152. The threaded inner channel 152 can be defined by a thread pattern that is compatible with a thread pattern of the exterior threaded portion 156 of the strain relief 106.

As previously discussed, the hanger channel 144 can be tapered such that a diameter of the hanger channel 144 at the hanger bottom portion 142 is greater than a diameter of the hanger channel 144 at the hanger top portion 140. The tapered shape of the hanger channel 144 can coerce or otherwise force the plurality of gripping flaps 158 of the strain relief 106 to progressively clamp onto or otherwise grip/pinch onto the pendant light cord 162 when the exterior threaded portion 156 of the strain relief 106 is screwed into the threaded inner channel 152 of the hanger 104. The plurality of gripping flaps 158 can be coerced or forced by the tapered hanger channel 144 within the hanger 104 to clamp or pinch onto the segment of the pendant light cord 162 extending through the part of the strain relief channel 160 created by the gripping flaps 158.

An installer can screw the strain relief 106 into the hanger 104 to essentially lock the pendant light cord 162 into place. If the installer wanted to later adjust the length of the proximal cord segment 166 of the pendant light cord 162, the installer can easily unscrew the strain relief 106 from the hanger 104 and adjust the length of the pendant light cord 162 until the proximal cord segment 166 is to the installer's liking. Thus, one major technical advantage of the pendant light mounting assembly 100 is that it provides an installer the ability to continuously adjust the length of the pendant light cord 162 to raise or lower the pendant light (see, e.g., FIG. 4A).

Figure 6B:
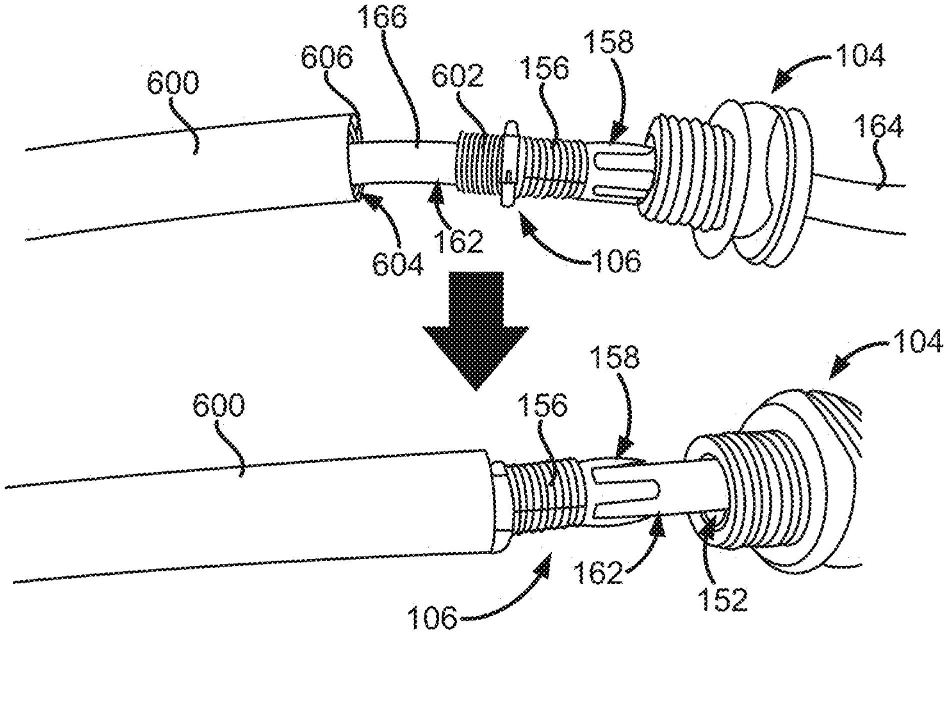
FIG. 6B illustrates that a pendant light rod can be detachably fastened to a bottom portion of another embodiment of the strain relief to allow the pendant light mounting assembly to be used to mount rod-hung pendant lights.

FIG. 6B illustrates that a pendant light rod 600 can be detachably fastened to a bottom portion of another embodiment of the strain relief 106 to allow the pendant light mounting assembly 100 to be used to mount a rod-hung pendant light. The embodiment of the strain relief 106 shown in FIG. 6B can comprise a bottom threaded portion 602 (the bottom threaded portion 602 can replace the strain relief base 154 or be positioned below the strain relief base 154).

As shown in FIG. 6B, the pendant light rod 600 can comprise a rod lumen 604 extending longitudinally through the pendant light rod 600. A rod internal threaded portion 606 can be defined along a distal segment of the rod lumen 604. The rod internal threaded portion 606 can be defined by a thread pattern that is compatible with a thread pattern of the bottom threaded portion 602 of the strain relief 106. For example, the rod internal threaded portion 606 can be in the form of a threaded receptable or sleeve and the bottom threaded portion 602 of the strain relief 106 can be in the form of a threaded male connector or adapter.

As shown in the bottom image of FIG. 6B, the bottom threaded portion 602 of the strain relief 106 can be screwed into the rod internal threaded portion 606 to detachably couple the pendant light rod 600 to the bottom of the strain relief 106.

The remainder of the strain relief 106 of FIG. 6B can function similar to the strain relief 106 of FIG. 6A. For example, the exterior threaded portion 156 of the strain relief 106 of FIG. 6B can be screwed into the hanger bottom portion 142 (e.g., the threaded inner channel 152) of the hanger 104 to coerce the gripping flaps 158 of the strain relief 106 to clamp or pinch onto the pendant light cord 162 to essentially lock the pendant light cord 162 into place.

The rod lumen 604 can be configured to act as a protective casing or shell for the pendant light cord 162. The pendant light cord 162 can extend through the entirety of the rod lumen 604.

In some embodiments, the pendant light rod 600 can be substantially shaped as an elongated cylindrical rod. The pendant light rod 600 can be made in part of a polymeric material, a metallic material, a ceramic material, or a composite thereof. As a more specific example, the pendant light rod 600 can be a metal rod (e.g., a stainless steel rod or aluminum rod).

The pendant light rod 600 can be made to be stiff or relatively inflexible. For example, the pendant light rod 600 can be made of a material that is stiffer or more inflexible than a material used to make the pendant light cord 162.

In some embodiments, a proximal or bottom end of the pendant light rod 600 can be connected to a pendant light shade (similar to the pendant light shade 404 of FIG. 4A). When a pendant light rod 600 is used to connect the pendant light shade to a pendant light canopy, the 19 entire light fixture can be referred to as a rod-hung pendant light or a semi-flush mount light.

Figure 7A:
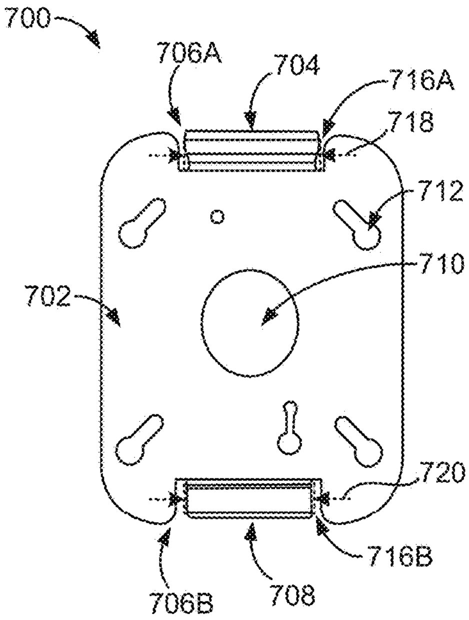
FIGS. 7A, 7B, and 7C are front, side, and side perspective views, respectively, of a mounting bracket of a flush mount assembly.
Figure 7B:
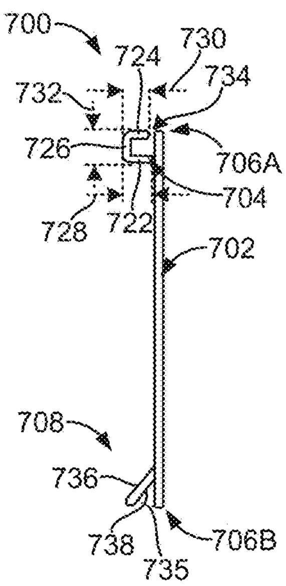
Figure 7C:
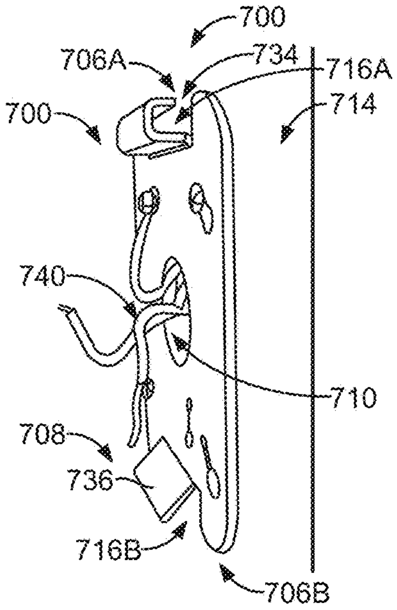

FIGS. 7A, 7B, and 7C are front, side, and side perspective views, respectively, of a mounting bracket 700 of a flush mount assembly 800 (see, e.g., FIG. 8B, FIG. 8C, FIG. 9A, FIG. 12A, FIG. 13A, or FIG. 13B). The flush mount assembly 800 can be configured to mount a flush mount light 410 to a wall (see, e.g., FIG. 4B) or ceiling. FIG. 4B illustrates several examples of flush mount lights 410 mounted flush with the wall 412 using the flush mount assembly 800.

The mounting bracket 700 can comprise a bracket plate body 702, an elongated flat hook 704 disposed at a first longitudinal end 706A of the bracket plate body 702, an angled guidance tab 708 disposed at a second longitudinal end 706B of the bracket plate body 702 opposite the first longitudinal end 706A, and a plate opening 710 defined along the bracket plate body 702 in between the first longitudinal end 706A and the second longitudinal end 706B.

The bracket plate body 702 can be a substantially flat metal plate having cutouts 712 (e.g., keyhole cutouts) or holes defined along the bracket plate body 702 to allow fasteners (e.g., screws) to extend through the cutouts 712 or holes to mount the mounting bracket 700 to a mounting surface 714 (see, e.g., FIG. 7C) such as a wall, a ceiling, or an electrical junction box defined thereon. Although FIG. 7A illustrates that the bracket plate body 702 as being substantially shaped as a rectangular plate having rounded corners, it is contemplated by this disclosure that the bracket plate body 702 can be substantially shaped as an oval plate or a polygonal plate having at least four sides.

FIG. 7A also illustrate that the bracket plate body 702 can have a first end gap 716A defined substantially in a center portion of the first longitudinal end 706A and a second end gap 716B defined substantially in a center portion of the second longitudinal end 706B.

The elongated flat hook 704 can be positioned along the first end gap 716A or adjacent to the first end gap 716A. For example, the elongated flat hook 704 can extend above or in front of the first end gap 716A such that most of the first end gap 716A is below or behind the elongated flat hook 704 or obscured by the elongated flat hook 704.

The angled guidance tab 708 can be positioned along the second end gap 716B or adjacent to the second end gap 716B. For example, the angled guidance tab 708 can extend above or in front of the second end gap 716B such that most of the second end gap 716B is below or behind the angled guidance tab 708 or obscured by the angled guidance tab 708.

As will be discussed in more detail in the following sections, the first end gap 716A can create a clearance space behind the elongated flat hook 704 when the mounting bracket 700 is mounted to a mounting surface 714 (e.g., wall, ceiling, or junction box) to allow a mating tab 746 (see FIG. 7D or FIG. 8A) to more easily hook onto the elongated flat hook 704. The second end gap 716B can create a clearance space behind the angled guidance tab 708 when the mounting bracket 700 is mounted to a mounting surface 714 to allow a threaded fastener 744 (see, e.g., FIG. 7D or FIG. 7E) to more easily access the angled guidance tab 708.

FIG. 7A also illustrates that the elongated flat hook 704 can have a hook width 718. In some embodiments, the hook width 718 can be between about 36.0 mm to 39.0 mm. The hook width 718 can be less than a width of the first end gap 716A.

FIG. 7A also illustrates that the angled guidance tab 708 can have a tab width 720. In some embodiments, the tab width 720 can be between about 36.0 mm to 39.0 mm. The tab width 720 can be less than a width of the second end gap 716B.

FIG. 7B illustrates that the elongated flat hook 704 can comprise a hook proximal segment 722, a hook distal segment 724, and a hook middle segment 726 connecting the hook proximal segment 722 and the hook distal segment 724.

The hook proximal segment 722 can have a proximal segment length 728. The hook distal segment 724 can have a distal segment length 730. The hook middle segment 726 can have a middle segment length 732.

The proximal segment length 728 can be greater than the distal segment length 730 to allow access to a hook clearance space 734 created between the elongated flat hook 7004 and the mounting surface 714 (exposed by the first end gap 716A at the first longitudinal end 706A) when the mounting bracket 700 is mounted to the mounting surface 714. For example, the proximal segment length 728 can be at least 3.0 mm greater than the distal segment length 730.

In some embodiments, the proximal segment length 728 can be between about 10.0 mm and 12.0 mm (e.g., about 11.0 mm). The distal segment length 730 can be between about 7.0 mm and 9.0 mm (e.g., about 8.0 mm). The middle segment length 732 can be between about 9.0 mm and 11.0 mm (e.g., about 10.0 mm).

The dimensions of the mounting bracket 700 disclosed herein (including the dimensions of the elongated flat hook 704) are optimized such that the hook clearance space 734 is not too spacious (which may result in the mountable enclosure 742 shifting around excessively when hooked onto the elongated flat hook 704) but is also not too constricting (which may restrict the free rotation of the mountable enclosure 742 during installation).

In some embodiments, a ratio of the proximal segment length 728 to the distal segment length 730 can be between about 1.33:1 to 1.71:1 (e.g., about 1.38:1). In addition, a ratio of the proximal segment length 728 to the middle segment length 732 can be between about 1.09:1 to 1.33:1. Moreover, a ratio of the distal segment length 730 to the middle segment length 732 can be between about 1:1.22 to 1:1.57.

As illustrated in FIG. 7B, the hook middle segment 726 can be substantially parallel to the bracket plate body 702. The hook proximal segment 722 and the hook distal segment 724 can be substantially perpendicular to the bracket plate body 702. The hook distal segment 724 the hook proximal segment 722 can be substantially parallel to each other.

FIG. 7B also illustrates that the angled guidance tab 708 can be raised or inclined with respect to the bracket plate body 702. The angled guidance tab 708 can be angled with respect to the bracket plate body 702 by an angle 735 of between about 40 degrees and 50 degrees (e.g., about 45 degrees).

The angled guidance tab 708 can comprise an enclosure-facing side 736 and a rear-facing side 738. The enclosure-facing side 736 is configured to face the mountable enclosure 742 when the mountable enclosure 742 is hooked onto the mounting bracket 700 and partially covers the bracket plate body 702. The rear-facing side 738 of the angled guidance tab 708 is configured to face the mounting surface 714 (the portion of the mounting surface 714 exposed by the second end gap 716B).

As will be discussed in more detail in the following sections, a threaded fastener 744 serving as part of the flush mount assembly 800 can be screwed into and through a threaded port 750 (see, e.g., FIG. 7D) defined along a bottom of the mountable enclosure 742. The threaded fastener 744 can be screwed through the threaded port 750 and into contact with the angled or inclined rear-facing side 738 of the angled guidance tab 708 to secure the mountable enclosure 742 to the mounting bracket 700.

The dimensions and shapes of the mounting bracket 700 disclosed herein are crucial for imparting certain advantages provided by the flush mount assembly 800. For example, the dimension and shapes of the elongated flat hook and the angled guidance tab 708 allow the mountable enclosure 742 of the flush mount assembly 800 to quickly and effectively engage with the mounting bracket 700 and allows the mountable enclosure 742 to be held or supported during the installation process.

Figure 13A:
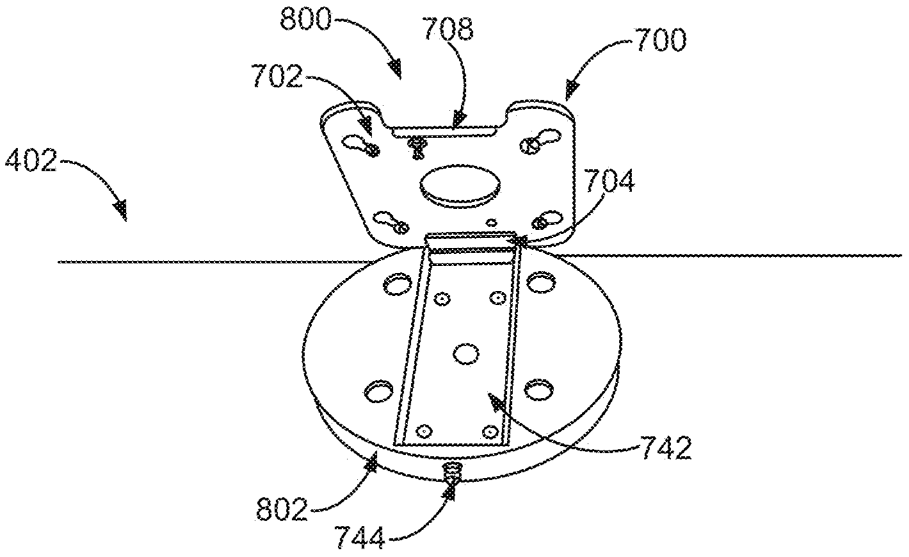
FIGS. 13A and 13B illustrate that the flush mount assembly can be used to mount a light socket enclosure of a ceiling flush mount light.
Figure 13B:
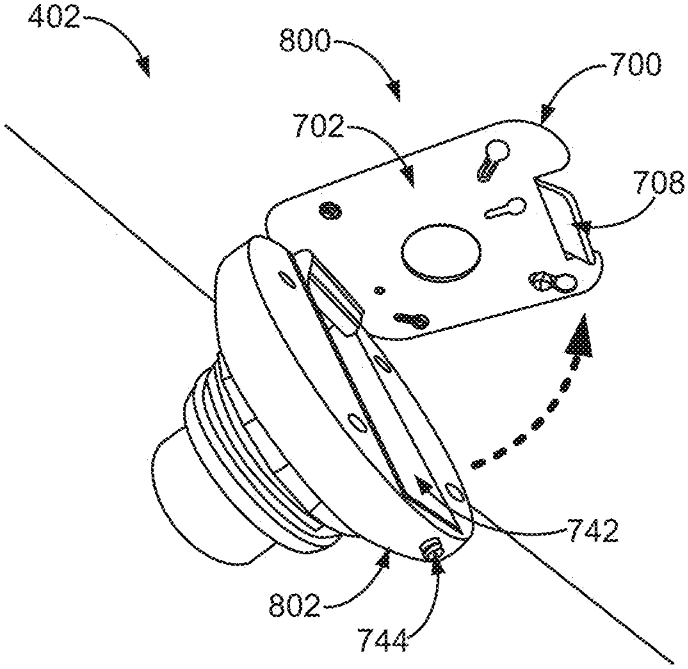

FIG. 7C illustrates that the mounting bracket 700 can be configured to be mounted to a wall junction box of a wall (the wall junction box is obscured by the mounting bracket 700 in FIG. 7C). FIG. 13A and FIG. 13B illustrate that the mounting bracket 700 can also be configured to be mounted to a ceiling junction box on the ceiling.

FIG. 7C also illustrates that the plate opening 710 can allow access to a plurality of electrical wires 740 from the wall junction box or ceiling junction box. The electrical wires 740 from the junction box can be connected to electrical wires of the flush mount light 410 as part of a wiring step of a flush mount light installation procedure. The plurality of electrical wires 740 can comprise a hot/live wire (usually colored black), a neutral wire (usually colored white), and a ground wire (usually colored green). In some embodiments, the electrical wires of the flush mount light 410 can be carried or otherwise bundled or sheathed by a light cord (see, e.g., FIG. 9A) extending out of part of the flush mount light 410 (e.g., an enclosure for a light socket).

Figure 7D:
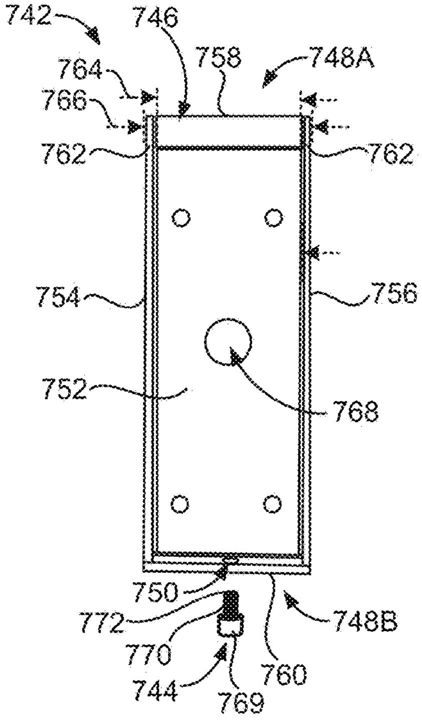
FIGS. 7D and 7E are front and rear views, respectively, of one embodiment of a mountable enclosure of the flush mount assembly.
Figure 7E:
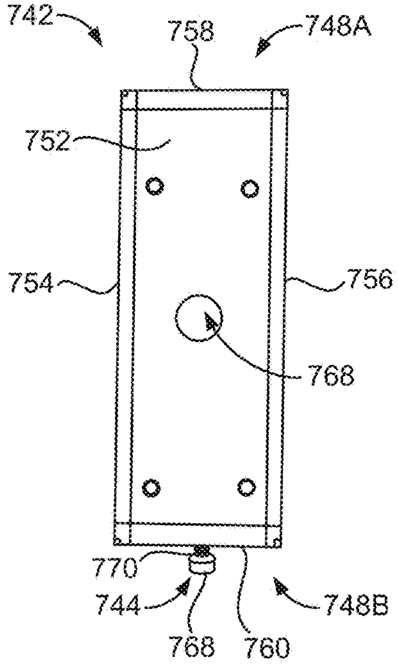

FIGS. 7D and 7E are front and rear views, respectively, of one embodiment of a mountable enclosure 742 and a threaded fastener 744 of the flush mount assembly 800 (see, e.g., FIG. 8B, FIG. 8C, FIG. 9A, FIG. 12A, FIG. 13A or FIG. 13B). The mountable enclosure 742 can be configured to be mounted to a back or rear of part of the flush mount light 410.

The mountable enclosure 742 can comprise a mating tab 746 extending from a first enclosure end 748A of the mountable enclosure 742 and a threaded port 750 defined along a second enclosure end 748B of the mountable enclosure 742 opposite the first enclosure end 748A. As will be discussed in more detail in the following sections, the mating tab 746 can be hooked onto the elongated flat hook 704 of the mounting bracket 700 and allow the mountable enclosure 742 to hang from the mounting bracket 700 during the installation procedure. When the mating tab 746 is hooked onto the elongated flat hook 704 of the mounting bracket 700, the mountable enclosure 742 can rotationally pivot with respect to the mounting bracket 700 (i.e., the mating tab 746 hooked onto the elongated flat hook 704 can act as a type of hinge). This can be helpful when an individual is installing the flush mount light 410 (especially a ceiling flush mount light) without additional help.

As shown in FIGS. 7D and 7E, the mountable enclosure 742 can be substantially shaped as a flattened rectangular trough having five sides. In some embodiments, the mountable enclosure 742 can comprise an enclosure bracket body 752 (e.g., serving as one side of the enclosure), a first enclosure lateral wall 754 extending perpendicularly from the enclosure bracket body 752 (e.g., serving as a second side of the enclosure), a second enclosure lateral wall 756 extending perpendicularly from the enclosure bracket body 752 and opposite the first enclosure lateral wall 754 (e.g., serving as a third side of the enclosure), a first enclosure longitudinal end wall 758 extending perpendicularly from the enclosure bracket body 752 (e.g., serving as a fourth side of the enclosure), and a second enclosure longitudinal end wall 760 extending perpendicularly from the enclosure bracket body 752 and opposite the first enclosure longitudinal end wall 758 (e.g., serving as a fifth side of the enclosure).

The mating tab 746 can extend from the first enclosure longitudinal end wall 758 of the mountable enclosure 742. In some embodiments, the mating tab 746 can be an excess portion of the first enclosure longitudinal end wall 758 that is folded or bent inward toward the enclosure bracket body 752. As will be discussed in more detail in the following sections, the mating tab 746 can be slightly angled with respect to the enclosure bracket body 752 and adjacent edges 762 of the first enclosure lateral wall 754 and the second enclosure lateral wall 756.

As shown in FIGS. 7D and 7E, the threaded port 750 can be defined along the second enclosure longitudinal end wall 760. The second enclosure longitudinal end wall 760 can be positioned at the bottom of the mountable enclosure 742 when the mountable enclosure 742 is held upright (with the mating tab 746 at the top of the mountable enclosure 742).

FIG. 7D also illustrates that the mating tab 746 can have a mating tab width 764 and the first enclosure longitudinal end 748A has an end width 766. The mating tab width 764 can be less than the end width 766.

For example, the mating tab width 764 can be between about 38.0 mm and 40.0 mm (e.g., about 39.0 mm). The end width 766 can be between about 42.0 mm and 44.0 mm (e.g., about 43.0 mm).

The enclosure bracket body 752 can further have a body opening 768 defined in a central portion of the enclosure bracket body 752. The body opening 768 can be an aperture, slot, or through-hole that allows electrical wires from the flush mount light 410 to extend through the enclosure bracket body 752 to be connected to electrical wires 740 from the junction box.

The flush mount assembly 800 can further comprise a threaded fastener 744. In some embodiments, the threaded fastener can be a bolt screw having a head or cap configured to receive a driving tool 902 such as a wrench, key, or driver (e.g., screwdriver) to screw in the threaded fastener 744. In some embodiments, the threaded fastener 744 can be a socket head bolt screw or machine screw or an Allen socket head screw. In other embodiments, the threaded fastener 744 can be a Phillips head bolt screw.

The threaded fastener 744 can comprise a fastener head 769, a fastener threaded portion 770, and a fastener tip 772 at a terminal or distal end of the fastener threaded portion 770. The fastener threaded portion 770 can have a thread length of between about 8.0 mm and 12.0 mm (e.g., about 10.0 mm). The entire length of the threaded fastener 744, as measured from a proximal end of the fastener head 769 to the fastener tip 772, can be between about 12.0 mm and 15.0 mm (e.g., about 13.0 mm).

In some embodiments, the fastener tip 772 can be a blunt tip or flat tip. The threaded fastener 744 can be made of a metallic material.

The mounting bracket 700 and the mountable enclosure 742 can be made in part of at least one of a metallic material and a fire-resistant polymeric material. In some embodiments, the mounting bracket 700 and the mountable enclosure 742 can be made in part of steel, stainless steel, aluminum, or an alloy thereof. In alternative embodiments, the mounting bracket 700 and the mountable enclosure 742 can be made in part of a fire-resistant polymeric material (e.g., fire-resistant acrylonitrile butadiene styrene).

Figure 8A:
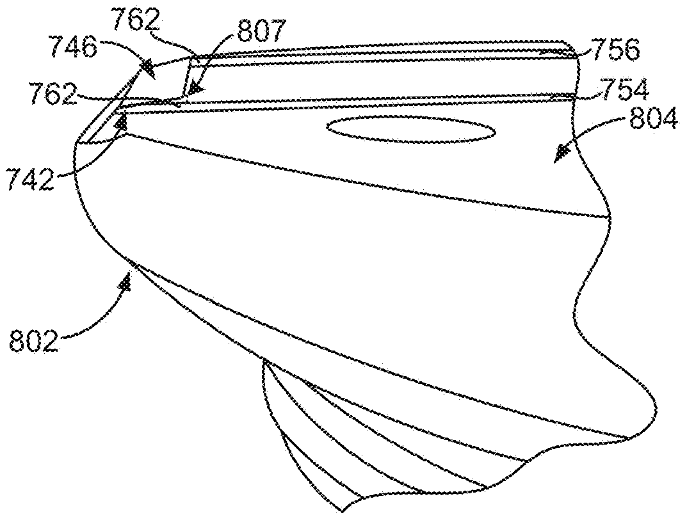
FIG. 8A illustrates a close-up view of one embodiment of a mating tab of the mountable enclosure coupled to a part of a light socket enclosure.

FIG. 8A illustrates a close-up view of one embodiment of a mating tab 746 of the mountable enclosure 742 coupled to a part of a light socket enclosure 802. For example, the mountable enclosure 742 can be coupled or otherwise fastened to a rear side 804 or back side of the light socket enclosure 802

In some embodiments, the light socket enclosure 802 can be considered part of the flush mount assembly 800.

Although FIG. 8A illustrates the mountable enclosure 742 coupled to the light socket enclosure 802, it is contemplated by this disclosure that the mountable enclosure 742 can be coupled to other parts of the flush mount light 410 including a base, a base cover, or another type of enclosure cover of the flush mount light 410.

As shown in FIG. 8A, the mating tab 746 can be angled with respect to the adjacent edges 762 of the first enclosure lateral wall 754 and the second enclosure lateral wall 756 or the enclosure bracket body 752 (see, e.g., FIG. 7D or FIG. 7E). The mating tab 746 can be angled with respect to the adjacent edges 762 or the enclosure bracket body 752 by a tab angle 807.

In some embodiments, the tab angle 807 can be between about 1 degree and 5 degrees. More specifically, the tab angle 807 can be between about 2 degrees and 3 degrees. This slight angle of the mating tab 746 can allow the mating tab 746 to more easily hook onto the elongated flat hook 704 of the mounting bracket 700 and can provide more room or clearance space under the mating tab 746 for the elongated flat hook 704 to pivot or change position when the mountable enclosure 742 is rotated toward the mounting bracket 700 to enclose the plurality of electrical wires and to couple the mountable enclosure 742 to the mounting bracket to complete the installation of the flush mount light 410.

Figure 8B:
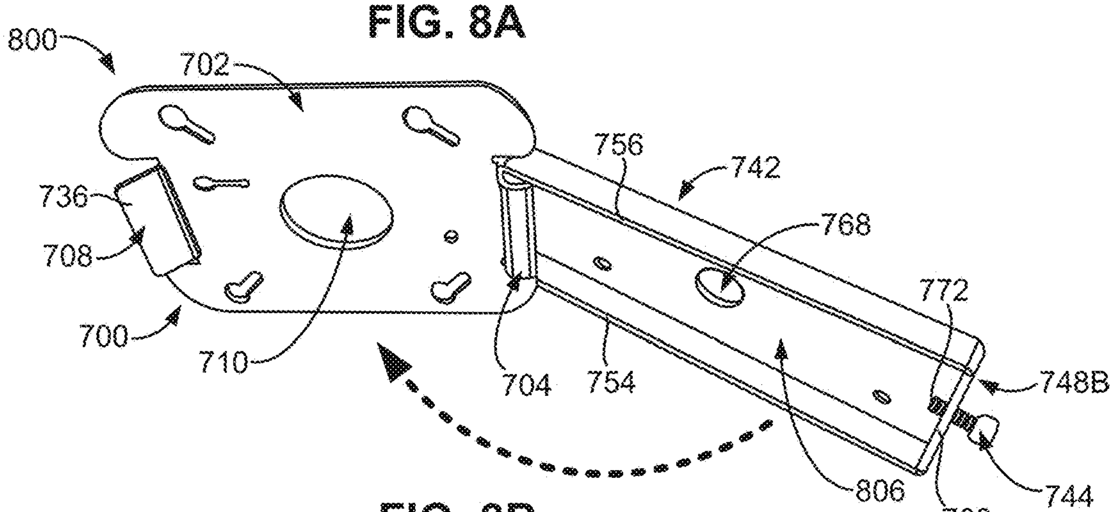
FIG. 8B illustrates that once the mountable enclosure is hooked onto an elongated flat hook of the mounting bracket via the mating tab, the mountable enclosure can be rotated toward the mounting bracket to detachably couple the mountable enclosure to the mounting bracket.

FIG. 8B illustrates that once the mountable enclosure 742 is hooked onto the elongated flat hook 704 of the mounting bracket 700 via the mating tab 746, the mountable enclosure 742 can be rotated toward the mounting bracket 700 to detachably couple the mountable enclosure 742 to the mounting bracket 700.

FIG. 8B illustrates that the mounting bracket 700 is positioned in a manner that would allow the mounting bracket 700 to be coupled to a ceiling junction box on the ceiling (for example, when the flush mount assembly 800 is used to mount a ceiling flush mount light). In the embodiment shown in FIG. 8B, the mountable enclosure 742 can be rotated upward toward the mounting bracket 700.

In other embodiments, when the mounting bracket 700 is coupled or fastened to a wall junction box (e.g., when the flush mount assembly 800 is used to mount a wall flush mount light), the mountable enclosure 742 can be rotated downward (or upward, depending on the mounted orientation of the mounting bracket 700) toward the mounting bracket 700.

FIG. 8B also illustrates that an enclosure cavity 806 can be defined by the five sides of the mountable enclosure 742. The elongated flat hook 704 and the angled guidance tab 708 can be positioned or otherwise contained within the enclosure cavity 806 when the mountable enclosure 742 is detachably coupled to the mounting bracket 700 (see, e.g., FIG. 8C).

Figure 8C:
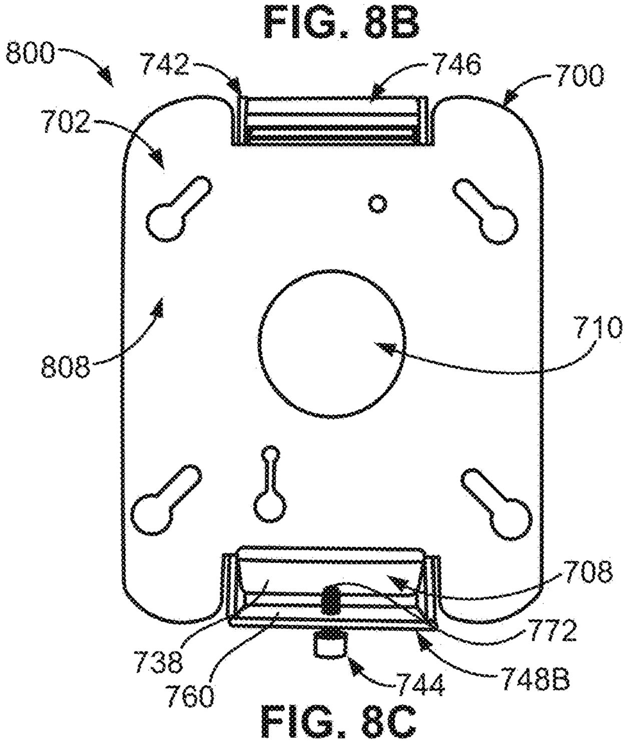
FIG. 8C illustrates a rear view of one embodiment of the flush mount assembly in a fully assembled configuration.

FIG. 8C illustrates a rear view of one embodiment of the flush mount assembly 800 in a fully assembled configuration. It should be pointed out that FIG. 8C shows a back side 808 of the mounting bracket 700 (while all other figures illustrate a front side of the mounting bracket 700).

FIG. 8C illustrates that when the flush mount assembly 800 is in the fully assembled configuration, the mating tab 746 of the mountable enclosure 742 is hooked onto or otherwise engaged with the elongated flat hook 704 of the mounting bracket 700 and the mountable enclosure 742 covers or encloses part of the mounting bracket 700 including the plate opening 710 defined along a central portion of the mounting bracket 700. Moreover, both the elongated flat hook 704 and the angled guidance tab 708 are housed or otherwise positioned within the enclosure cavity 806. Furthermore, segments of the first enclosure lateral wall 754 and the second enclosure lateral wall 756 are in physical contact with the front side of the mounting bracket plate body 702.

FIG. 8C further illustrates that the threaded fastener 744 can be screwed into and through the threaded port 750 (see, e.g., FIG. 7D) defined along the second enclosure longitudinal end wall 760 of the mountable enclosure 742. The fastener tip 772 of the threaded fastener 744 can physically contact and be pushed against the rear-facing side 738 of the angled guidance tab 708 to detachably couple the mountable enclosure 742 to the mounting bracket 700. As the fastener tip 772 is pushed or otherwise driven into the rear-facing side 738 of the angled guidance tab 708, the mountable enclosure 742 can be clamped onto or otherwise forcibly immobilized against the mounting bracket 700. In this way, part of the bracket plate body 702 and the mountable enclosure 742 creates a tightly closed fire-proof enclosure to contain or house the plurality of connected electrical wires. As previously discussed, both the mounting bracket 700 and the mountable enclosure 742 are made out of a fire-proof material (e.g., a metallic material such as steel).

Figure 9A:
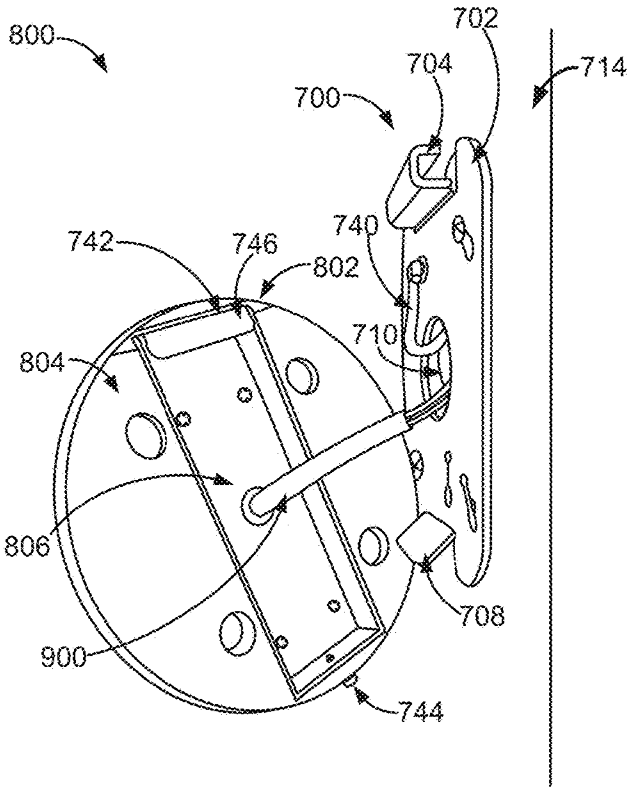
FIGS. 9A and 9B illustrate the mountable enclosure coupled to a part of a sconce and the mountable enclosure in the process of being detachably coupled to the mounting bracket mounted to a wall.
Figure 9B:
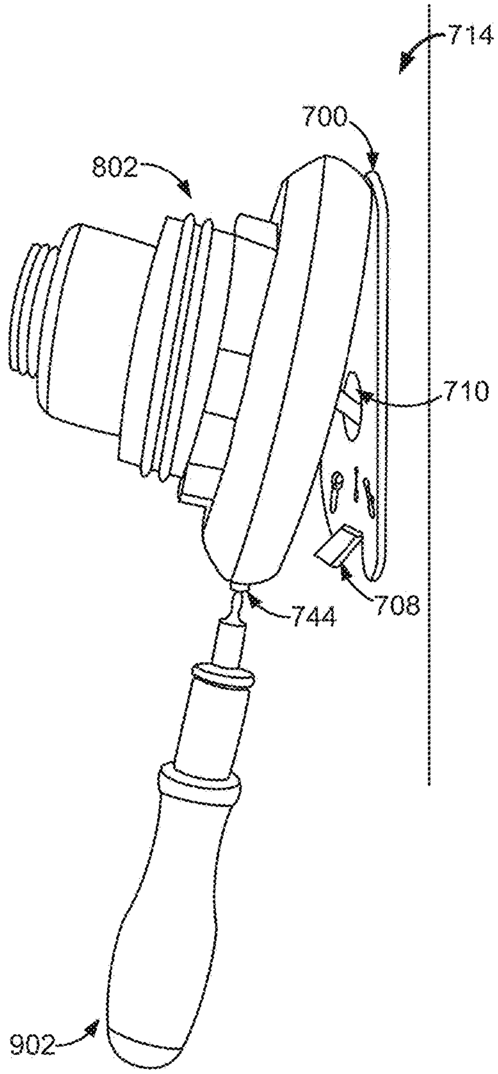

FIGS. 9A and 9B illustrate the mountable enclosure 742 coupled to a part of a sconce (wall flush mount light) and the mountable enclosure 742 in the process of being detachably coupled to the mounting bracket 700 mounted to a mounting surface 714 (such as a wall). In some embodiments, the mountable enclosure 742 can be coupled or otherwise affixed (e.g., by fasteners such as screws or by an adhesive) to a light socket enclosure 802.

Although FIGS. 9A and 9B illustrate the mountable enclosure 742 coupled to the light socket enclosure 802, it is contemplated by this disclosure that the mountable enclosure 742 can be coupled to other parts of the sconce including a base, a base cover, or another type of enclosure cover of the sconce.

FIGS. 9A and 9B illustrate part of a method for mounting a sconce or a flush mount wall light. The method can comprise fastening or coupling a mounting bracket 700 to at least one of a wall junction box and part of a wall serving as the mounting surface 714. The mounting bracket 700 can comprise a bracket plate body 702, an elongated flat hook 704 disposed at a first end of the bracket plate body 702, and an angled guidance tab 708 disposed at a second end of the bracket plate body 702 opposite the first end. The method can also comprise hooking or otherwise placing a mountable enclosure 742, coupled to a part of the sconce (e.g., the light socket enclosure 802), onto the elongated flat hook 704 of the mounting bracket 700. The mountable enclosure 742 can comprise a mating tab 746 extending from a first enclosure end of the mountable enclosure 742 and a threaded port 750 (see, e.g., FIG. 7D) defined along a second enclosure end of the mountable enclosure 742 opposite the first 6 enclosure end. The mating tab 746 of the mountable enclosure 742 can be hooked or otherwise placed onto the elongated flat hook 704 of the mounting bracket 700. The method can further comprise rotationally pivoting or rotating the mountable enclosure 742 toward the mounting bracket 700 and screwing a threaded fastener 744 into and through the threaded port 750 and into contact with the angled guidance tab 708 to detachably secure or otherwise couple the mountable enclosure 742 to the mounting bracket 700 when the mating tab 746 is hooked onto the elongated flat hook 704.

FIG. 9A also illustrates that part of the method of mounting the sconce or flush mount wall light can also comprise connecting certain electrical wires 900 from the sconce or the flush mount wall light (e.g., electrical wires connected to a light socket of the sconce or flush mount wall light) to counterpart electrical wires 740 extending from the wall junction box. This wiring step can be completed before screwing the threaded fastener 744 into the threaded port 750 to secure or otherwise couple the mountable enclosure 742 to the mounting bracket 700.

The enclosure cavity 806 of the mountable enclosure 742 can cover the plate opening 710 of the mounting bracket 700 when the mountable enclosure 742 is secured to the mounting bracket 700.

Although not shown in FIG. 9A, the light socket enclosure 802 can comprise an opening or aperture defined along a bottom of the light socket enclosure 802 to allow the threaded fastener 744 to access the threaded port 750.

FIG. 9B illustrates that a driving tool 902 can be used to screw in the threaded fastener 744. In some embodiments, the driving tool 902 can be a screwdriver, a wrench (e.g., Allen wrench or hex wrench), a key (e.g., Allen key or hex key), or driver bit. The driving tool 902 used can be dependent on the type of threaded fastener 744 used to secure the mountable enclosure 742 to the mounting bracket 700.

Figure 10A:
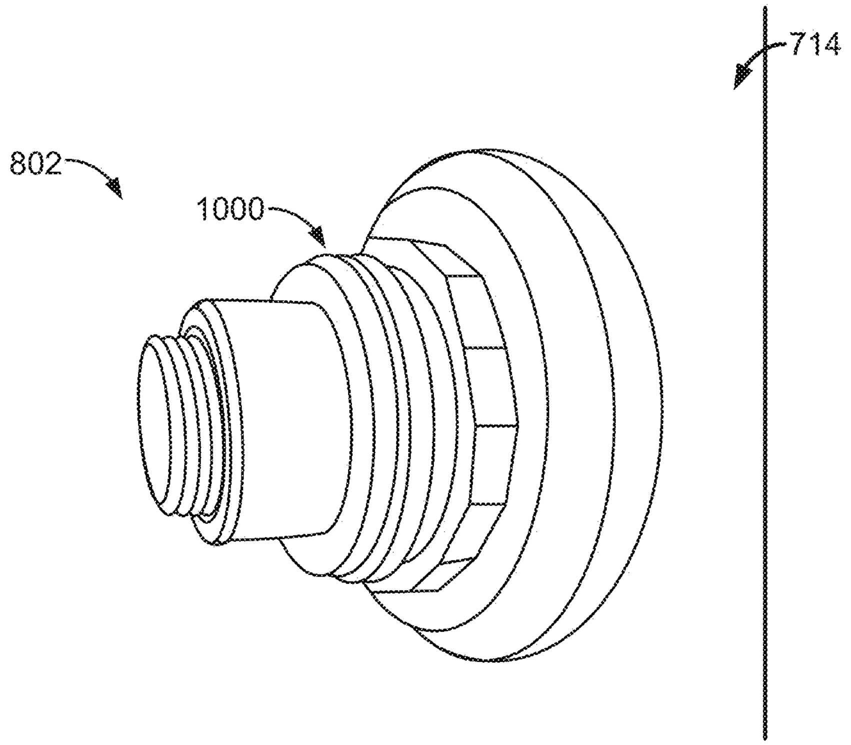
FIG. 10A illustrates one embodiment of a light socket enclosure that can be coupled to the mountable enclosure.

FIG. 10A illustrates one embodiment of a light socket enclosure 802 that can receive the mountable enclosure 742 (see, e.g., FIG. 7D and FIG. 7E) and be coupled to the mountable enclosure 742. As illustrated in FIG. 10A, the light socket enclosure 802 can comprise a substantially circular base or substantially disk-shaped base. The light socket enclosure 802 can also comprise a plurality of additional disk-shaped or cylindrical layers that extend out from the substantially circular or disk-shaped base and that are positioned concentric with the substantially circular or disk-shaped base.

In other embodiments, the light socket enclosure 802 can be substantially shaped as a frustoconic or shaped as a truncated polygonal pyramid.

It is contemplated by this disclosure that the shape or form factor of the light socket enclosure 802 can extend beyond those shown in the figures as long as the light socket enclosure 802 comprises a rear side 804 (see, e.g., FIG. 8A) configured to receive or accommodate the mountable enclosure 742 (for example, a divot or depression that allows the mountable enclosure 742 to be placed within part of the light socket enclosure 802).

In some embodiments, at least part of the light socket enclosure 802 can be made by 3D-printing. In certain embodiments, the entire light socket enclosure 802 can be made by 3D-printing.

In other embodiments, at least part of the light socket enclosure 802 can be made using a traditional manufacturing technique such as injection molding FIG. 10A also illustrates that the light socket enclosure 802 can comprise one or more mating interfaces 1000 for detachably mating to at least one of a base cover 1002 or light base, a light diffuser, and a light shade 1006. In some embodiments, the mating interface 1000 can be an indexed interface such as an indexed ring-type interface.

The light socket enclosure 802 can also comprise a threaded interface as one of the mating interfaces 1000. For example, as shown in FIG. 10A, the light socket enclosure 802 can comprise a threaded interface protruding or extending from the light socket enclosure 802.

As shown in FIG. 10A, in some instances, the light socket enclosure 802 can completely cover and conceal the mounting bracket 700 and the mountable enclosure 742 when the mountable enclosure 742 coupled to part of the light socket enclosure 802 is detachably coupled to the mounting bracket 700 via the threaded fastener 744. In other embodiments, at least part of the mounting bracket 700 and/or the mountable enclosure 742 can still be visible when the mountable enclosure 742 coupled to part of the light socket enclosure 802 is detachably coupled to the mounting bracket 700 via the threaded fastener 744. In these embodiments, additional components of the flush mount light 410 (e.g., the sconce) can be fastened or otherwise coupled to the light socket enclosure 802 to hide or conceal the mounting bracket 700 and/or the mountable enclosure 742.

Figure 10B:
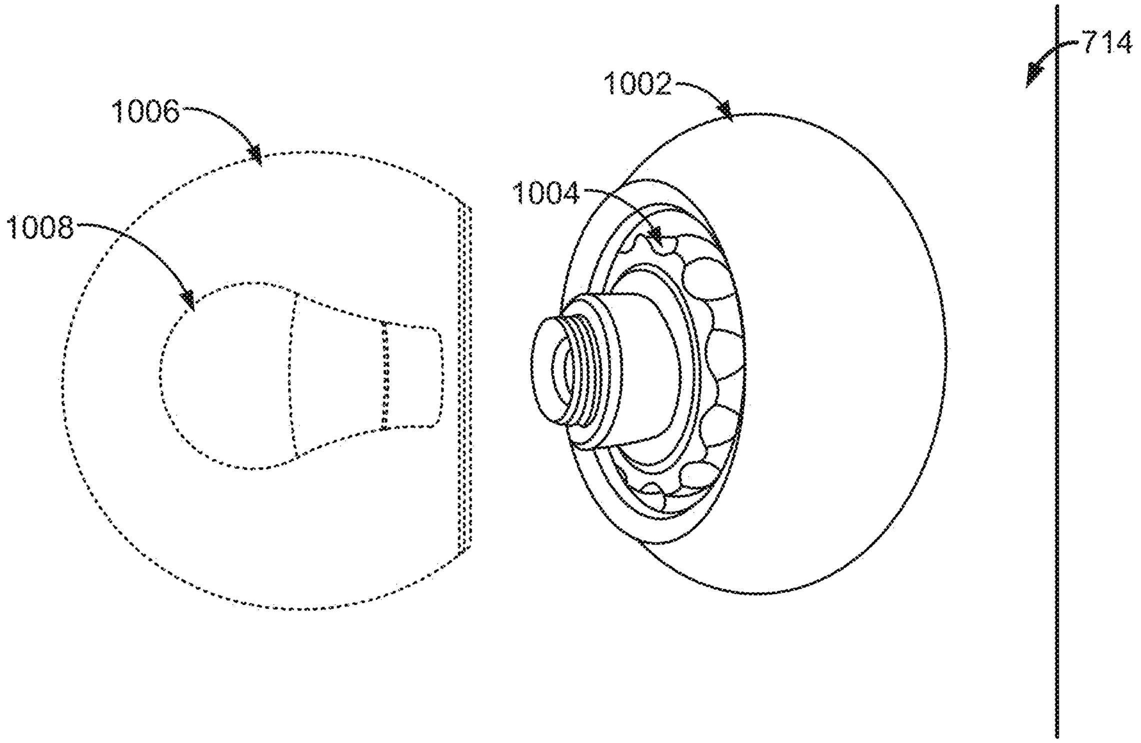
FIG. 10B illustrates a base cover detachably coupled to the light socket enclosure coupled to the mountable enclosure.

FIG. 10B illustrates a base cover 1002 detachably coupled to the light socket enclosure 802 coupled to the mountable enclosure 742 (see, e.g., FIG. 9A). As shown in FIG. 10B, the base cover 1002 can be detachably affixed or coupled to the light socket enclosure 802 via a threaded collar 1004 screwed onto a threaded interface serving as the mating interface 1000 of the light socket enclosure 802 (see, e.g., FIG. 10A). For example, the threaded collar 1004 can be screwed or otherwise fastened to the threaded interface of the light socket enclosure 802 and push or clamp the base cover 1002 to the light socket enclosure 802.

In some embodiments, at least part of the base cover 1002 or the threaded collar 1004 can be made by 3D-printing. In certain embodiments, the entire base cover 1002 or the entire threaded collar 1004 can be made by 3D-printing.

In some embodiments, the base cover 1002 can completely cover and conceal the mounting bracket 700, the mountable enclosure 742, and the threaded fastener 744. This can make the sconce appear mounted completely flush against a wall.

In certain embodiments, the base cover 1002 and the threaded collar 1004 (along with the light socket enclosure 802) can be considered part of the flush mount assembly 800. In other embodiments, the base cover 1002, the threaded collar 1004, and the light socket enclosure 802 can be considered components that are compatible with the flush mount assembly 800 but not part of the flush mount assembly 800 (which comprises, in these embodiments, the mounting bracket 700, the mountable enclosure 742, and the threaded fastener 744).

Figure 11A:
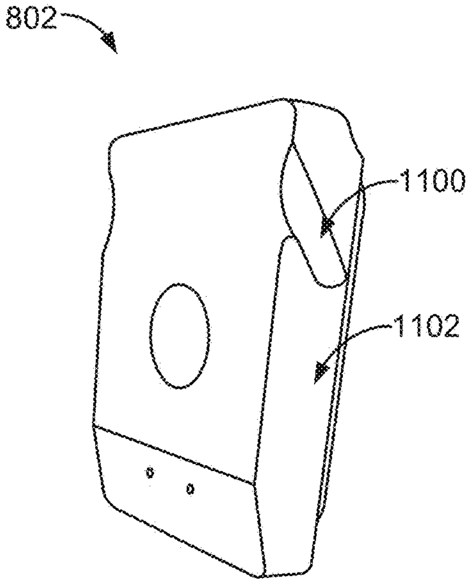
FIGS. 11A and 11B illustrate perspective views of another embodiment of a light socket enclosure that can be coupled to the mountable enclosure.
Figure 11B:
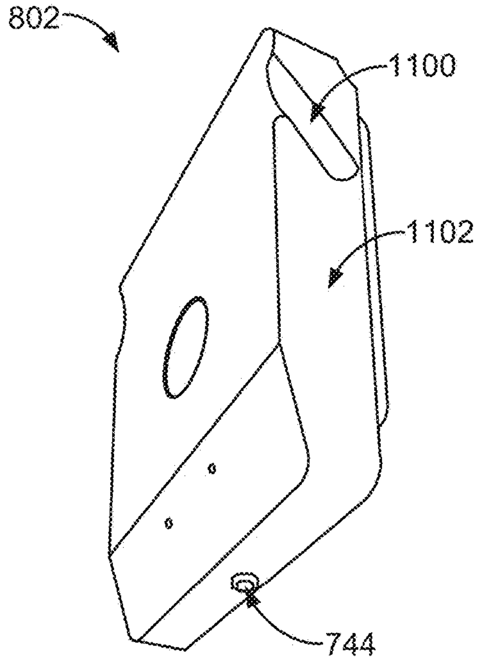

FIG. 10B also illustrates that a light shade 1006 (shown in broken or phantom lines) can also be detachably coupled or fastened to at least one of the light socket enclosure 802, the base cover 1002, and the threaded collar 1004. A light bulb 1008 (shown in broken or phantom lines) can also be detachably coupled or fastened to a light socket enclosure 802 to make the sconce or wall flush mount light functionally operable. FIGS. 11A and 11B illustrate perspective views of another embodiment of a light socket enclosure 802 that can be coupled to the mountable enclosure 742 (see, e.g., FIG. 7D and FIG. 7E). For example, the mountable enclosure 742 can be coupled to a back side or rear of the light socket enclosure 802 shown in FIG. 11A or FIG. 11B.

As shown in FIGS. 11A and 11B, the light socket enclosure 802 can be substantially shaped as cuboid or box. In these embodiments, the light socket enclosure 802 can comprise angled grooves 1100 defined along external lateral sides 1102 of the light socket enclosure 802. The angled grooves 1100 can be configured to mate with complementary features (see, e.g., FIG. 11D) of a cover or housing of part of the wall flush mount light.

Figure 11C:
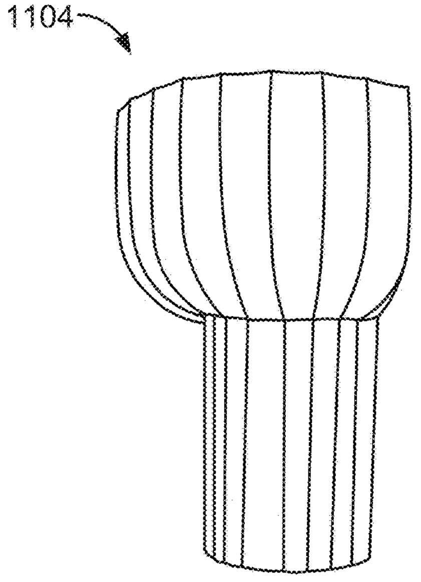
FIG. 11C illustrates a perspective view of a decorative light shade that can be detachably slid onto the light socket enclosure of FIGS. 11A and 11B.

FIG. 11C illustrates a perspective view of a decorative light shade 1104 or decorative housing that can be detachably coupled to the light socket enclosure 802 of FIGS. 11A and 11B. The decorative light shade 1104 can completely cover and conceal the light socket enclosure 802 when the light socket enclosure 802 is mounted to the wall via the mountable enclosure 742 and the mounting bracket 700. The decorative light shade 1104 can also completely cover and conceal the mounting bracket 700, the mountable enclosure 742, and the threaded fastener 744. This can make the decorative light appear mounted completely flush against the wall (see, e.g., top image of FIG. 4B).

Figure 11D:
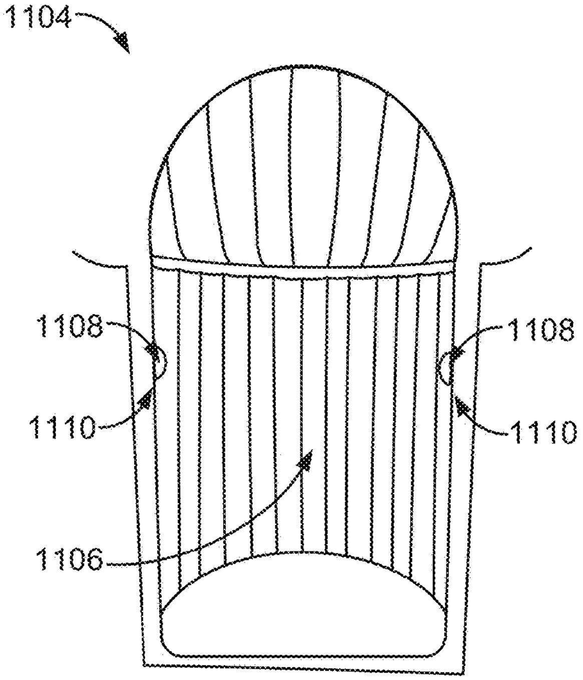
FIG. 11D illustrates a close-up view of an interior cavity of the decorative light shade of FIG. 11C comprising protuberances configured to allow the decorative light shade to be slid onto the light socket enclosure.

FIG. 11D illustrates a close-up view of an interior cavity 1106 of the decorative light shade 1104 of FIG. 11C comprising protuberances 1108 (e.g., protuberances shaped as hemispheres) extending laterally inward from internal lateral sides 1110 of the decorative light shade 1104 configured to allow the decorative light shade 1104 to be slid onto the light socket enclosure 802. For example, the protuberances 1108 extending laterally inward from the internal lateral sides 1110 of the decorative light shade 1104 can be directed or otherwise introduced into the angled grooves 1100 of the light socket enclosure 802. The protuberances can slide down the angled grooves 1100 and rest against or be supported by the closed or terminal ends of the angled grooves 1100.

In some embodiments, at least part of the decorative light shade 1104 can be made by 3D-printing. In certain embodiments, the entire decorative light shade 1104 can be made by 3D-printing.

Although FIGS. 11C and 11D illustrate a particular decorative light shade 1104, it is contemplated by this disclosure that the shape or form factor of the decorative light shade can be changed and can go beyond the shapes and form factors disclosed and illustrated herein.

Moreover, although a decorative light shade 1104 is shown in FIGS. 11C and 11D, it is contemplated by this disclosure that a light diffuser or other type of housing can also be detachably coupled to (e.g., slid onto) the light socket enclosure 802. In these embodiments, protuberances similar to the protuberances 1108 shown in FIG. 11D can extend laterally inward from internal lateral sides of the light diffuser or other type of housing.

Figure 12A:
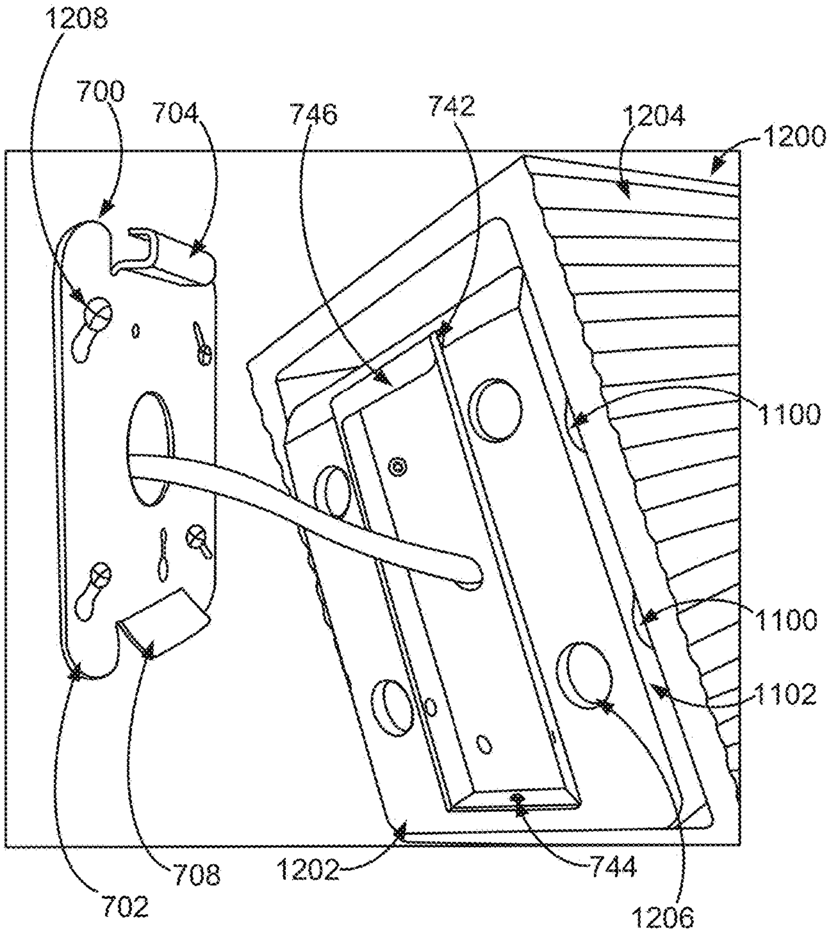
FIG. 12A illustrates another embodiment of a sconce comprising the mountable enclosure coupled to a rear of an embodiment of a light base and the mountable enclosure about to be hooked onto an elongated flat hook of the mounting bracket.

FIG. 12A illustrates another embodiment of a sconce 1200 comprising the mountable enclosure 742 coupled to a rear of an embodiment of a light base 1202 and the mountable enclosure 742 about to be hooked onto an elongated flat hook 704 of the mounting bracket 700.

Figure 12B:
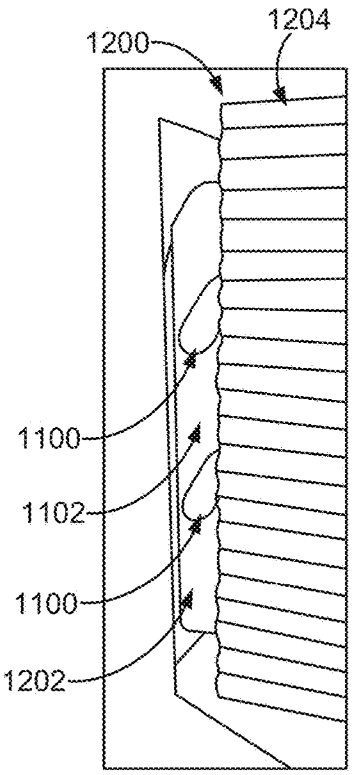
FIG. 12B illustrates a decorative housing of the sconce of FIG. 12A about to be slid onto the light base.

The light base 1202 shown in FIG. 12A and FIG. 12B can be similar to the light socket enclosure 802 shown in FIG. 11A or FIG. 11B except the light base 1202 of FIG. 12A and FIG. 12B does not contain or house a light socket of the sconce 1200 and further comprises four angled grooves 1100 (two angled grooves 1100 on each external lateral side 1102 of the light base 1202) for mating with complementary features on a cover, diffuser, or decorative housing 1204 of the sconce 1200. In these embodiments, the light socket of the sconce 1200 can be housed within the decorative housing 1204. Also, in these embodiments, the decorative 19 housing 1204 of the sconce 1200 can be made inseparable from the light base 1202 yet moveable relative to the light base 1202. This can be done to protect a user or installer since certain electrical components or wires may extend in between the light base 1202 and the decorative housing 1204

FIG. 12B illustrates the decorative housing 1204 of the sconce 1200 of FIG. 12A about to be slid onto the light base 1202. For example, the decorative housing 1204 can comprise a plurality of protuberances extending laterally inward from internal lateral sides of the decorative housing 1204 configured to allow the decorative housing 1204 to be slid onto the light base 1202. The protuberances (two on each internal lateral side) of the decorative housing 1204 can be directed or otherwise introduced into the angled grooves 1100 of the light base 1202. The protuberances can slide down the angled grooves 1100 and rest against or be supported by the closed or terminal ends of the angled grooves 1100.

In some embodiments, at least part of the decorative housing 1204 or the light base 1202 can be made by 3D-printing. In certain embodiments, the entire decorative housing 1204 or the entire light base 1202 can be made by 3D-printing.

The decorative housing 1204 can completely cover and conceal the light base 1202 when the light base 1202 is mounted to the wall or wall junction box via the mountable enclosure 742 and the mounting bracket 700. The decorative housing 1204 can also completely cover and conceal the mounting bracket 700, the mountable enclosure 742, and the threaded fastener 744. This can make the decorative housing

1204 appear mounted completely flush against the wall (see, e.g., bottom image of FIG. 4B).

FIG. 12A also illustrates that the light base 1202 can comprise a plurality of indentations 1206 or divots (e.g., circular indentations or divots) arranged around a rear side of the light base 1202 to allow the light base 1202 to more easily be coupled to the mounting bracket 700. The plurality of indentations 1206 or divots make room or create space for fasteners 1208 used to fasten the mounting bracket 700 to a wall junction box or wall. For example, the plurality of indentations 1206 or divots make room or create space for the heads of such fasteners 1208 when the light base 1202 is detachably coupled to the mounting bracket 700.

FIGS. 13A and 13B illustrate that the flush mount assembly 800 can be used to mount a light socket enclosure 802 of a ceiling flush mount light. As shown in FIGS. 13A and 13B, the mounting bracket 700 can be mounted or otherwise fastened to a ceiling junction box or part of the ceiling 402. The mountable enclosure 742 can be hooked onto the elongated flat hook 704 of the mounting bracket 700 and can freely hang from the elongated flat hook 704.

The mountable enclosure 742 can also pivot or rotate with respect to the mounting bracket 700 mounted to the ceiling junction box and/or ceiling when the mating tab 746 of the mountable enclosure 742 is hooked onto the elongated flat hook 704 and freely hangs from the mounting bracket 700. This can allow a user to connect electrical wires from a light socket of the ceiling flush mount light to electrical wires extending from the ceiling junction box.

FIGS. 13A and 13B illustrate part of a method for mounting a ceiling flush mount light. The method can comprise fastening the mounting bracket 700 to at least one of the ceiling junction box and part of a ceiling 402. The mounting bracket 700 can comprise a bracket plate body 702, an elongated flat hook 704 disposed at a first end of the bracket plate body 702, and an angled guidance tab 708 disposed at a second end of the bracket plate body 702 opposite the first end. The method can also comprise hooking or otherwise placing a mountable enclosure 742, coupled to a part of the ceiling flush mount light (e.g., the light socket enclosure 802), onto the elongated flat hook 704 of the mounting bracket 700. The mountable enclosure 742 can comprise a mating tab 746 extending from a first enclosure end of the mountable enclosure 742 and a threaded port 750 (see, e.g., FIG. 7D) defined along a second enclosure end of the mountable enclosure 742 opposite the first enclosure end. The mating tab 746 of the mountable enclosure 742 can be hooked or otherwise placed onto the elongated flat hook 704 of the mounting bracket 700. The method can further comprise rotationally pivoting or rotating the mountable enclosure 742 upward toward the mounting bracket 700 and screwing a threaded fastener 744 into and through the threaded port 750 and into contact with the angled guidance tab 708 to detachably secure or otherwise couple the mountable enclosure 742 to the mounting bracket 700 when the mating tab 746 is hooked onto the elongated flat hook 704.

One technical problem faced by the applicant is how to design a flush mount assembly that can be used to mount various types of flush mount lights (including ceiling flush mount lights and wall flush mount lights) without having to mount a custom-made mounting bracket to a mounting surface each time. Another technical problem faced by the applicant is how to design a flush mount assembly that can be easily installed or mounted by one person without special tools. Yet another technical problem faced by the applicant is how to design a flush mount assembly that allows room for misalignment error. One technical solution discovered and developed by the applicant is the unique flush mount assembly disclosed herein that addresses all of the aforementioned problems. The flush mount assembly comprises a mounting bracket comprising a bracket plate body configured to be mounted to either a wall/wall junction box or a ceiling/ceiling junction box. The mounting bracket is low profile and small and only requires a few screws to mount to a junction box.

The mounting bracket comprises an elongated flat hook disposed at a first end of the bracket plate body and an angled guidance tab disposed at a second end of the bracket plate body opposite the first end. A mountable enclosure of the flush mount assembly can be coupled to a part of the flush mount light (e.g., a light socket enclosure) and then hooked onto the elongated flat hook of the mounting bracket. The mountable enclosure can comprise a mating tab extending from a first enclosure end of the mountable enclosure and a threaded port defined along a second enclosure end of the mountable enclosure opposite the first enclosure end. The mating tab of the mountable enclosure can be hooked or otherwise placed onto the elongated flat hook of the mounting bracket. An installer can then rotationally pivot or rotate the mountable enclosure toward the mounting bracket and screw a threaded fastener into and through the threaded port and into contact with the angled guidance tab to detachably secure or otherwise couple the mountable enclosure to the mounting bracket when the mating tab is hooked onto the elongated flat hook. It has been discovered by the applicant that the geometries, shapes, and/or dimensions of the mounting bracket, the mountable enclosure, and the threaded fastener disclosed herein impart significant benefits that allow the flush mount assembly to operate effectively.

One technical advantage provided by the flush mount assembly disclosed herein is that an individual installer can perform any necessary wiring steps (i.e., connect the necessary electrical wires) while the mountable enclosure is hung from the mounting bracket. By hanging the mountable enclosure (which is coupled to part of the flush mount light) from the mounting bracket during this crucial step, this frees up both of the installer's hands to undertake the important (and risky) wiring procedure. Once the wiring step is completed, the installer can then rotate the mountable enclosure toward the mounting bracket and screw the threaded fastener into place to essentially lock the mountable enclosure to the mounting plate. If the installer wishes to adjust the wiring, the installer can simply unscrew the threaded fastener from the mountable enclosure to open up the mountable enclosure. If a user wishes to change the flush mount light entirely, the user can disconnect the electrical wires while the mountable enclosure is hung from the mounting bracket and then easily unhook the mountable enclosure from the mounting bracket. A new flush mount light can then be installed by repeating the above steps Moreover, another technical advantage of the flush mount assembly is that the mounting bracket, mountable enclosure, and threaded fastener can all be covered by a simple base cover or decorative housing that can be secured flush against a mounting surface (either a ceiling or wall).

Each of the individual variations or embodiments described and illustrated herein has discrete components and features which may be readily separated from or combined with the features of any of the other variations or embodiments. Modifications may be made to adapt a particular situation, material, composition of matter, process, process act(s) or step(s) to the objective(s), spirit or scope of the present invention.

Methods recited herein may be carried out in any order of the recited events that is logically possible, as well as the recited order of events. Moreover, additional steps or operations may be provided or steps or operations may be eliminated to achieve the desired result.

Furthermore, where a range of values is provided, every intervening value between the upper and lower limit of that range and any other stated or intervening value in that stated range is encompassed within the invention. Also, any optional feature of the inventive variations described may be set forth and claimed independently, or in combination with any one or more of the features described herein. For example, a description of a range from 1 to 5 should be considered to have disclosed subranges such as from 1 to 3, from 1 to 4, from 2 to 4, from 2 to 5, from 3 to 5, etc. as well as individual numbers within that range, for example 1.5, 2.5, etc. and any whole or partial increments therebetween.

All existing subject matter mentioned herein (e.g., publications, patents, patent applications) is incorporated by reference herein in its entirety except insofar as the subject matter may conflict with that of the present invention (in which case what is present herein shall prevail). The referenced items are provided solely for their disclosure prior to the filing date of the present application. Nothing herein is to be construed as an admission that the present invention is not entitled to antedate such material by virtue of prior invention.

Reference to a singular item, includes the possibility that there are plural of the same items present. More specifically, as used herein and in the appended claims, the singular forms "a," "an," "said" and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Unless defined otherwise, all technical and scientific terms used herein have the same meaning as commonly understood by one of ordinary skill in the art to which this invention belongs.

In understanding the scope of the present disclosure, the term "comprising" and its derivatives, as used herein, are intended to be open-ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" "element," or "component" when used in the singular can have the dual meaning of a single part or a plurality of parts. As used herein, the following directional terms "forward, rearward, above, downward, vertical, horizontal, below, transverse, laterally, and vertically" as well as any other similar directional terms refer to those positions of a device or piece of equipment or those directions of the device or piece of equipment being translated or moved. Finally, terms of degree such as "substantially", "about" and "approximately" as used herein mean a reasonable amount of deviation (e.g., a deviation of up to ±0.1%, ±1%, ±5%, or ±10%, as such variations are appropriate) from the specified value such that the end result is not significantly or materially changed.

This disclosure is not intended to be limited to the scope of the particular forms set forth, but is intended to cover alternatives, modifications, and equivalents of the variations or embodiments described herein. Further, the scope of the disclosure fully encompasses other variations or embodiments that may become obvious to those skilled in the art in view of this disclosure.

We claim:

1. An assembly for mounting a pendant light, comprising:

a mounting bracket comprising a bracket lower plate, at least two bracket arms extending from the bracket lower plate to allow the mounting bracket to be mounted to a ceiling junction box on a ceiling, a U-shaped slot defined along part of the bracket lower plate, and two inclined tabs extending from the bracket lower plate;

a hanger comprising a hanger top portion and a hanger bottom portion, wherein the hanger comprises a hanger channel extending longitudinally through the hanger, wherein at least a segment of the hanger channel comprises a threaded inner channel, wherein the hanger top portion comprises a hanger head, a hanger skirt, and a hanger groove defined in between the hanger head and the hanger skirt, wherein the hanger groove only partially extends around a circumference of the hanger top portion; and a strain relief comprising an exterior threaded portion, a plurality of gripping flaps, and a strain relief channel extending longitudinally through the strain relief, wherein the strain relief channel is configured to receive a pendant light cord of the pendant light, wherein the plurality of gripping flaps is configured to clamp onto the pendant light cord when the exterior threaded portion is screwed into the threaded inner channel of the hanger, wherein the hanger is detachably secured to and hangs from the mounting bracket when the hanger top portion is slid into the U-shaped slot, and wherein the two inclined tabs prevent the hanger from inadvertently sliding out of the U-shaped slot when the hanger hangs from the mounting bracket.

2. The assembly of claim 1, further comprising a pendant light canopy and a securement knob, wherein the pendant light canopy comprises a hanger contact surface, canopy lateral walls extending from the hanger contact surface, a canopy cavity defined by the hanger contact surface and the canopy lateral walls, and a canopy opening defined in a center of the hanger contact surface, wherein the securement knob comprises a threaded lumen, wherein the hanger comprises an exterior hanger threaded portion, and wherein a portion of the securement knob extends into the canopy cavity and the hanger contact surface is pushed against an underside of the hanger skirt when the threaded lumen is screwed onto the exterior hanger threaded portion to secure the pendant light canopy to the hanger.

3. The assembly of claim 1, further comprising a decorative pendant canopy, wherein the decorative pendant canopy comprises a fire-proof enclosure disposed at a top of the decorative pendant canopy, wherein the fire-proof enclosure comprises an enclosure opening, wherein the decorative pendant canopy further comprises a canopy threaded lumen exposed by the enclosure opening, wherein the hanger comprises an exterior hanger threaded portion, and wherein the canopy threaded lumen is screwed onto the exterior hanger threaded portion to secure the decorative pendant canopy to the hanger.

4. The assembly of claim 2, wherein the pendant light canopy is made in part of at least one of a metallic material and a fire-proof polymeric material.

5. The assembly of claim 1, wherein the hanger is made in part of at least one of a metallic material and a fire-proof polymeric material, and wherein the strain relief is made of a polymeric material.

6. The assembly of claim 1, wherein the bracket lower plate further comprises a plate tail at a rear of the bracket lower plate, wherein the plate tail and at least one of the inclined tabs are configured to support an excess segment of the pendant light cord extending out of the hanger top portion that is wrapped around the mounting bracket.

7. The assembly of claim 1, wherein the hanger channel is tapered such that a diameter of the hanger channel at the hanger bottom portion is greater than a diameter of the hanger channel at the hanger top portion, wherein the tapered shape of the hanger channel forces the plurality of gripping flaps to clamp onto the pendant light cord when the exterior threaded portion is screwed into the threaded inner channel of the hanger.

8. The assembly of claim 1, wherein the hanger groove has a groove height, and wherein the groove height is greater than a thickness of the bracket lower plate to allow the hanger to slide into the U-shaped slot more easily.

9. The assembly of claim 1, wherein each of the bracket arms comprises a distal arm segment and a proximal arm segment connected to the distal arm segment, wherein the proximal arm segment is connected to the bracket lower plate, wherein the distal arm segment is oriented substantially parallel to the bracket lower plate and is positioned vertically above the bracket lower plate to create a clearance space to allow the hanger to slide into the U-shaped slot and hang from the bracket lower plate.

10. The assembly of claim 9, wherein each of the bracket arms is shaped as a staircase step such that the proximal arm segment is oriented substantially perpendicular to the bracket lower plate and the distal arm segment.

11. The assembly of claim 1, wherein each of the two inclined tabs is angled upward relative to the bracket lower plate at an angle between 15 degrees and 35 degrees.

12. The assembly of claim 1, further comprising a pendant light rod comprising a rod lumen extending longitudinally through the pendant light rod and a rod internal threaded portion defined along a distal segment of the rod lumen, wherein at least a segment of the pendant light cord is configured to extend through the rod lumen, wherein the strain relief comprises a bottom threaded portion, wherein the bottom threaded portion is configured to be screwed into the rod internal threaded portion to allow the pendant light rod to be detachably coupled to the strain relief fastened to the hanger.

13. The assembly of claim 1, wherein the hanger skirt is shaped as a flattened frustoconic comprising a conically sloped portion, and wherein at least part of the hanger groove extends down to the conically sloped portion.

14. The assembly of claim 1, wherein the hanger groove extends between 250 degrees and 300 degrees around the circumference of the hanger top portion.

15. The assembly of claim 1, wherein the U-shaped slot comprises a widened open end and a semicircular closed end opposite the widened open end, wherein the widened open end has an open end width and the semicircular closed end has a closed end diameter, wherein the open end width is greater than the closed end diameter, wherein a ratio of the closed end diameter and the open end width is between 1:1.25 and 1:1.50, and wherein each of the two inclined tabs has a laterally inward side, and wherein at least part of each of the laterally inward sides defines the widened open end.

16. A method of mounting a pendant light, comprising:

fastening a mounting bracket to a ceiling junction box, wherein the mounting bracket comprises a bracket lower plate, a U-shaped slot defined along part of the bracket lower plate, and two inclined tabs extending from the bracket lower plate;

sliding a hanger down the two inclined tabs into the U-shaped slot to hang the hanger from the mounting bracket; and screwing a strain relief having a pendant light cord extending therethrough into a threaded inner channel of the hanger to clamp the strain relief to a segment of the pendant light cord, wherein the pendant light cord is connected to the pendant light.

* * * * *